United States Patent [19]

Jernberg

[11] Patent Number: 5,036,876

[45] Date of Patent: Aug. 6, 1991

[54] NON-REFILLABLE CYLINDER VALVE FOR RETURNABLE CYLINDERS

[75] Inventor: Robert H. Jernberg, East Hampton, Conn.

[73] Assignee: Amtrol Inc., West Warwick, R.I.

[21] Appl. No.: 560,877

[22] Filed: Jul. 31, 1990

[51] Int. Cl.[5] .............................................. F16K 15/18

[52] U.S. Cl. ........................... 137/454.6; 137/614.05; 251/82

[58] Field of Search ........... 137/454.6, 533.17, 614.05, 137/454.2, 454.5; 251/82

[56] References Cited

U.S. PATENT DOCUMENTS

| | | | |
|---|---|---|---|
| 570,524 | 11/1896 | Weber . | |
| 871,780 | 11/1907 | Card . | |
| 1,305,747 | 6/1919 | Sechrist . | |
| 2,524,129 | 10/1950 | Klein | 251/144 |
| 2,710,021 | 6/1955 | Jones | 137/514.5 |
| 2,895,497 | 7/1959 | Jones | 137/316 |
| 2,933,284 | 4/1960 | Yocum | 251/278 |
| 3,053,499 | 9/1962 | Jones | 251/284 |
| 3,089,627 | 5/1963 | Lippig | 222/511 |
| 3,111,141 | 11/1963 | Hughes | 137/630.22 |
| 3,396,940 | 8/1968 | Jones | 251/335 |
| 3,529,599 | 9/1970 | Folkman et al. | 128/275 |
| 3,534,771 | 10/1970 | Eyerdam et al. | 137/516.25 |
| 3,552,421 | 1/1971 | Yocum | 137/321 |
| 3,589,386 | 6/1971 | Chapman et al. | 137/269 |
| 3,589,397 | 6/1971 | Wagner | 137/614.2 |
| 3,601,152 | 8/1971 | Kenworthy | 137/525 |
| 3,669,407 | 6/1972 | Mundt et al. | 251/334 |
| 3,700,207 | 10/1972 | Bartlett | 251/88 |
| 3,704,813 | 12/1972 | Devol | 222/147 |
| 3,726,309 | 4/1973 | Neubert | 137/528 |
| 3,759,294 | 9/1973 | Kongelka | 137/612.1 |
| 3,766,940 | 10/1973 | Mason | 137/460 |
| 3,782,858 | 1/1974 | Deters | 417/26 |
| 3,812,841 | 5/1974 | Isaacson | 128/1 R |
| 3,830,252 | 8/1974 | Follett | 137/519.5 |
| 3,861,548 | 1/1975 | Bereziat | 215/22 |
| 3,871,792 | 3/1975 | Gritz | 417/38 |
| 3,876,336 | 4/1975 | Nash | 417/38 |
| 3,896,835 | 7/1975 | Wicke | 137/75 |
| 3,902,522 | 9/1975 | Karenfeld | 137/484.6 |
| 3,902,663 | 9/1975 | Elmer | 236/87 |
| 3,922,111 | 11/1975 | Deters | 417/26 |
| 3,970,106 | 7/1976 | Harris | 137/843 |
| 3,970,285 | 7/1976 | Lonn | 251/214 |
| 3,985,332 | 10/1976 | Walker | 251/111 |
| 3,993,099 | 11/1976 | Nightingale | 137/625.48 |
| 4,022,425 | 5/1977 | Govzman et al. | 251/324 |
| 4,027,851 | 6/1977 | Schlotman | 251/172 |
| 4,036,467 | 7/1977 | Dalton | 251/14 |
| 4,049,017 | 9/1977 | Jones | 137/540 |
| 4,072,162 | 2/1978 | Bellehache et al. | 137/71 |
| 4,088,301 | 5/1978 | Ehmig | 251/334 |
| 4,154,369 | 5/1979 | Morane | 222/147 |
| 4,158,362 | 6/1979 | Durrett et al. | 128/272 |
| 4,205,690 | 6/1980 | Layton | 128/768 |

(List continued on next page.)

FOREIGN PATENT DOCUMENTS

| | | |
|---|---|---|
| 3337197 | 2/1985 | Fed. Rep. of Germany . |
| 2536818 | 6/1984 | France . |
| 2071044 | 9/1981 | United Kingdom . |
| 2088317 | 6/1982 | United Kingdom . |
| 2133502 | 7/1984 | United Kingdom . |

*Primary Examiner*—Stephen M. Hepperle
*Attorney, Agent, or Firm*—Fisher, Christen & Sabol

[57] ABSTRACT

A replaceable, non-refillable or single use valve for returnable, pressurized gas cylinders. The valve includes a valve housing removably mounted on the cylinder and a replaceable valve cartridge removably mounted in the valve housing. The valve cartridge includes a housing and a valve body movable in the housing movable by means of a handle to allow and prevent release of pressurized gas from the cylinder. A nozzle, which slidably fits in a vertical slot in the valve housing, is provided for venting pressurized gas from the cylinder.

16 Claims, 12 Drawing Sheets

U.S. PATENT DOCUMENTS

| | | | |
|---|---|---|---|
| 4,254,792 | 3/1981 | Schadel | 137/240 |
| 4,280,498 | 7/1981 | Jensen | 128/283 |
| 4,286,573 | 9/1981 | Nickel | 126/362 |
| 4,291,689 | 9/1981 | Hay | 128/200.24 |
| 4,307,731 | 12/1981 | Kaufman | 128/766 |
| 4,326,541 | 4/1982 | Eckels | 128/766 |
| 4,328,828 | 5/1982 | Cianci | 137/549 |
| 4,334,537 | 6/1982 | Peterson | 128/275 |
| 4,340,068 | 7/1982 | Kaufman | 128/766 |
| 4,341,330 | 7/1982 | Mascia et al. | 222/401 |
| 4,368,754 | 1/1983 | Roberts | 137/315 |
| 4,369,812 | 1/1983 | Paradis et al. | 137/843 |
| 4,406,304 | 9/1983 | Vamvakas | 137/544 |
| 4,428,560 | 1/1984 | Erdelsky | 251/149.1 |
| 4,543,980 | 10/1985 | van der Sanden | 137/315 |
| 4,573,611 | 3/1986 | O'Connor | 222/147 |
| 4,597,559 | 7/1986 | Kirk | 251/144 |
| 4,660,744 | 4/1987 | Csaszar | 222/147 |
| 4,766,927 | 8/1988 | Conatser | 137/315 |
| 4,813,575 | 3/1989 | O'Connor | 222/147 |
| 4,905,730 | 3/1990 | Stoll | 251/82 X |
| 4,921,013 | 5/1990 | Spalink et al. | 137/614.05 |
| 4,921,214 | 5/1990 | Jernberg | 251/335.2 |

NON-REFILLABLE CYLINDER VALVE FOR RETURNABLE CYLINDERS

BACKGROUND OF THE INVENTION

1. Field of the Invention

The invention relates to replaceable, non-refillable or single use valves for returnable pressurized systems. The valve includes a valve housing mounted on the container, a replaceable valve cartridge mounted in the valve housing, the valve cartridge having a housing and a valve body movable in the housing by means of a handle to allow and prevent release of pressurized fluid from the container. A nozzle, which slidably fits in a vertical slot in the valve housing, is provided for venting pressurized fluid from the container.

2. Background Art

Pressure tanks or other pressure containers are usually filled under carefully controlled conditions at a charging station and then distributed to various places for use. Unfortunately, the attractive economies of refilling containers at points of use or otherwise repressurizing them under less than carefully supervised conditions has resulted, in the less consequential cases, in the introduction of impurities or inferior refills and, in the more consequential cases, to injurious explosions. The reuse of pressure containers is highly objectionable for many reasons which relate to safety.

U.S. Pat. No. 4,428,560 describes an outlet coupling member for a propellant storage construction and a method of making the same. The outlet member can be detachably interconnected to an outlet means and has a valve unit therein. The valve requires a plunger to be axially moved inward into the unit to open the unit to remove the contents of the propellant storage container. The valve construction allows the container to be non-refillable.

U.S. Pat. No. 570,524 describes a non-refillable bottle. The bottle is made non-refillable by having an inwardly-tapering or conical throat and a shoulder in the base of the mouth. A combination of the valve, the annulus having the grooves or channels at its base, the cork and the peg inserted in and depending from the cork and bearing at its lower end a valve makes the bottle non-refillable.

U.S. Pat. No. 4,154,369 describes a non-refillable dispensing container. The product is dispensed by a removable dispensing pump. The attachment is in the form of a connector fixed in the container neck and includes a fitting connecting the inlet of the pump to the interior of the container to dispense the product when the pump is operated. When the pump is removed, the connector blocks the container neck against practicable refilling.

U.S. Pat. No. 4,660,744 describes a non-refillable fitment, which takes the form of a hollow cylindrical housing having a valve seat disposed in a lower portion thereof. A valve in the form of an annular ring is provided within the housing and a vented retainer is inserted in an upper portion of the housing. The cylindrical housing may be inserted within the neck of a conventional bottle in much the same manner as a cork and, when so inserted and the bottle is vertically disposed, the inner circumferential surface of the valve seals against the valve seat and the outer circumferential surface of the valve seals against an inner circumferential surface of the hollow cylindrical housing to prevent refilling. When the bottle is inclined to a pouring angle, the valve is cocked against the retainer to permit pouring to take place.

U.S. Pat. No. 3,985,332 describes a non-refillable safety valve for a pressure container. The valve includes a housing, having a central bore, which provides communication between a port and the pressure container for charging and selective discharging the pressure container. The central bore has a lower portion that is narrower than the upper portion of the central bore. A hollow knob unit, having a central bore, is in threaded engagement with the outer wall of the housing. A core, having a central bore, is slidably mounted in the central bore of the housing. The upper end of the hollow knob unit is mounted on the core in a rotatable manner and in fixed longitudinal relationship with the core. A sealing member is slidably mounted in the lower end portion of the central bore of the core. The core contains end stop means for preventing movement of the sealing member below the lower end of the core. The sealing member engages the interface ledge formed by the lower upper portions of the central bore of the housing when the core is moved the maximum possible distance into the central bore of the core or when refill is attempted after discharge of the pressure container. The core contains at least one passageway located in the core outwards from the sealing member for communication between the central bore of the core and said upper portion of the central core, of the housing. An engagable stop means is positioned between the outer surface of the housing and the inner surface of the hollow knob unit in order to limit retrograde or outward movement of the core to a position whereby the sealing member still engages the interface ledge when refilling the pressure container. The engagable stop means engages after the pressure container has been filled and the sealing member, the core and the knob unit have been moved into sealing position.

U.S. Pat. No. 4,813,575 discloses a non-refillable valve having a housing with a central bore, which has a lower portion that is narrower that its middle portion that in turn is narrower than its upper portion. A side port is present in the lower region of the middle portion. An outlet nozzle is located in the side port. The lower end of the housing sealingly engages the pressure container to provide communication there-between. The valve stem is rotatably positioned in the upper portion of the central bore. The valve stem contains a vertical bore in its bottom portion. A resilient valve sealing member has a body portion and a top pin which slidably fits in the bore in the valve stem. The sealing member has a top rim portion which has a continuous outer surface and does not have any slots, indentations or the like. Also, the body portion does not have any arm or arms, particularly around its periphery. The top rim portion of the sealing member is comprisingly positioned in the upper portion of the central bore when the valve is inactive or being filled. The valve sealing member is pushed into the middle portion via the valve stem when the valve is placed in the active position. The non-compressed top rim of the sealing member is wider than the upper portion of the central bore, which prevents movement of the sealing member back into the upper portion of the central bore. The sealing member engages the seating interface when any refill of the container with pressurized fluid is attempted.

There is a need for a relatively simple and inexpensive, replaceable valve which allows normal filling of the returnable pressure container under proper conditions, adequate sealing of the pressure container during nonuse, selective discharge of the pressure container, and effective prevention of improper and unauthorized refilling of the container.

BROAD DESCRIPTION OF THE INVENTION

An object of the invention is to provide a non-refillable valve having a replaceable valve cartridge for compressed gas containers, for example, cylinders. Another object of the invention is to provide such a non-refillable valve, once activated, which will move freely to permit discharge of the pressurized fluid and which will move automatically to the closed position for preventing the introduction of fluid into the container. Another object of the invention is to provide such a replaceable valve cartridge. A further object of the invention is to provide a comparatively simple, inexpensive, non-refillable valve, having a replaceable valve cartridge, which when initially filled and sealed will permit discharge of the contents of a pressure container, but which will prevent the introduction of further fluid into the container. A still further object of the invention is to provide a non-refillable valve, having a replaceable valve cartridge, which will prevent refilling of a pressure container even though it is substantially disassembled. Another object of the invention is to provide a non-refillable valve, having a replaceable valve cartridge, for pressure containers that fulfills the needs of the art regarding such systems. Another object of the invention is to provide a non-refillable valve, having a replaceable valve cartridge, which is automatically activated in its non-refillable function by placing in its closed position ready for discharge of pressurized fluid from the pressure container it is mounted on. Other objects and advantages of the invention are set out herein or are obvious herefrom to one ordinarily skilled in the art.

The non-refillable valve, replaceable valve cartridge and processes of the invention achieve such objects and advantages.

The invention involves the concept of using an attachable valve that can be used to convert an ordinary container into a non-refillable one. More specifically, the attachable valve has a housing which, for example, can be screwed into the cylinder much as with a conventional valve. Further, some of the parts of the valve structure and part of the working mechanism of the non-fillable cylinder valve are similar to the one described in U.S. Pat. No. 4,813,575.

The invention involves a non-refillable valve for a pressure container, which includes a housing, having an upper end and a lower end, having a central bore thereby forming a housing wall, and having a slot, in the housing wall, which extends from the top of the housing to a position down the housing. The lower end of the housing is adapted to sealingly engage the pressure container in a manner which provides communication between the pressure container interior and the contents therein and the lower portion of the central bore. There is also a replaceable valve cartridge. The replaceable valve cartridge is positioned in a slidable and removable manner in the central bore of the housing. The replaceable valve cartridge comprises:

(a) a housing, having a central bore which has a lower portion that is narrower than the middle portion of said central bore and which has an upper portion that is narrower than the middle portion of said central bore, and having a side port which communicates with the lower region of said middle portion of said central bore, said central bore, via said portion, communicating with said lower portion of said central bore of housing;

(b) a nozzle, having a bore therein which communicates with the atmosphere, said nozzle being positioned on the side of said housing (a) and being in communication with said middle portion of said central bore via said side port in said housing (a), said nozzle extending through the lower portion of said slot in said housing wall of housing, said nozzle being slidable in said slot;

(c) valve stem means positioned in said upper portion of said central bore in a rotatable manner which advances the valve stem means back and/or forth in said central bore, said valve stem means having a threadable connection with said upper portion of said central bore, said valve stem means containing a centrally-located bore in the bottom portion thereof, the central axis of said bore being coaxial with the central axis of said upper portion of said central bore of said housing;

(d) retaining means having a passageway therein, the upper portion of said valve stem means (c) being slidably and/or rotatably positioned in said passageway, said retaining means (b) being detachably affixed to the upper end of said housing wall of housing; and (e) a resilient valve sealing member which has a body portion and which has a post positioned on the top of said body portion, said post slidingly engaging said bore in said valve stem means (c), said body portion having a top rim portion which has a lateral dimension which is larger than the lateral dimension of said upper portion of said central bore of said housing (a) and which is less than the lateral dimension of the middle portion of said central bore of said housing (a), said body portion having a bottom seating portion which is capable of seating at or on the interface of said middle portion and bottom portion of said central bore of said housing (a), said top rim portion being continuous such that it does not contain any indentations, slots, or gaps, and said body portion not containing any arms, said top rim portion of said valve sealing member (e) being compressingly positioned in said upper portion of said central bore when said valve is inactive or being filled, said valve sealing member (e) being pushed into said middle portion by means of said valve stem means (c) when said valve cartridge is placed in the active position, said valve sealing member (e) being seated against said interface between said middle and lower portions of said central bore when said valve cartridge is closed, said valve sealing member (e) being positioned in said middle chamber above said seating interface when said valve cartridge is used for discharge of said container contents, and said valve sealing member (e) sealingly engaging said seating interface when refill of said container with pressurized fluid is attempted.

The cartridge housing is forced upwards in the central bore of the housing when the container contains pressurized gas. When the top of the valve stem contacts the inside of the retainer means, the contained outward turning of the valve stem causes the housing of the valve cartridge to be forced downward on the internal threads of central bore of the housing and the external threads of the valve stem. The valve cartridge is removable so that it can be replaced when the container is to be refilled with pressurized gas.

This embodiment of the non-refillable valve allows the cylinder to be filled with pressurized gas at a filing site or plant. The filled cylinder is non-refillable in the field (by the user). Once the cylinder is partially or completely emptied, the cylinder is returned to a filling site or plant for refilling. The replaceable valve cartridge is removed and disposed of. A new replaceable valve cartridge, in the filling mode, is inserted and the cylinder is refilled.

Preferably the pressure container is a pressurized gas container and preferably the pressurized gas container is a pressurized gas cylinder. The valve stem means is preferably mounted in the upper portion of the central bore in a screwable manner. Preferably the valve stem means has an externally-located knob for turning the valve stem means. An O-ring is preferably mounted in a groove in the valve stem means positioned in the upper portion of the central bore and sealingly and slidably engages the surface of the upper portion of the central bore. Also, preferably the valve sealing member is made of a resilient plastic. Preferably the bottom rim of the body portion is bevelled Preferably an O-ring is mounted in a groove in the lower end of the housing of the valve cartridge and sealingly and slidably engages the surface of the central bore of the valve housing in which the valve cartridge is located.

The valve sealing member of the invention valve cartridge is not prevented from seating by any detent which is external to the valve sealing member itself.

In the inactive phase, the valve sealing member is held in the upper portion of the central bore of the valve housing by the means of the compressed, elastic, top rim portion of the valve sealing member. The condition allows the passage, formed by the lower and middle portions of the central bore of the housing and the bore of the outlet nozzle to be used in a filling operation. After the container has been filled and the invention valve is placed in the closed position, the valve sealing member assumes its operative configuration for preventing the flow of fluid into the container in the filling direction. The valve sealing member is virtually inaccessible for tampering to hold it open such as would become necessary for refilling the container.

The invention valve cartridge of the non-refillable valve does not use any spring means to operate the valve sealing member in any of its functions.

The invention valve has a single line of communication or passageway that serves both for the initial filling operation and subsequently for the controlled discharge of fluid. The valve sealing member is initially not located in that passage. The valve sealing is convertible from an initially inactive condition and location utilized during the initial filling operation into its active configuration and located to block subsequent flow in that passage in the filling direction.

When the invention valve is being closed, thus signalling completion of the filling operation, the invention valve automatically causes the valve system to convert to its non-refillable state. The invention valve has a shut off means that incorporates the valve sealing member to control and/or stop the delivery of fluid from the pressure container.

The invention valve is a non-refillable valve, having a replaceable valve cartridge, that allows one filling and then selective discharging. The invention valve is designed to prevent, and does prevent, the refilling of a pressure container. In this manner, the invention valve allows actual attainment of governmental requirements for a valve that prevents refilling of certain pressure containers (except at a refilling site or plant).

The invention non-refillable valve, including its replaceable valve cartridges, is effective, but relatively simple, and is inexpensive to construct. The invention non-refillable valve is fail-proof in the matter of charging, storing and selective discharging. Subsequent filling of the pressure container is prevented by the invention non-refillable valve.

The non-refillable valve of the invention can be used for fluids, i.e., gases and/or liquids, preferably pressurized gas. The fluid can contain solids that are discharged from the pressure vessel as entrained solids, etc. Many forms of liquefiable fluids are sold in disposable containers. Small metal tanks containing liquefied propane, liquefied butane and refrigerants such as FREON are examples. When containers of such type are filled by manufacturer who has full control of the starting condition of the container and of the filling procedures and the specifications, a relatively safe product can be distributed to the public. However, sometimes empty or partly empty containers are collected and these are refilled by poorly skilled and poorly equipped persons. The result is often a hazardous product. The non-refillable valve of the invention prevents such problems and associated dangers.

The invention non-refillable valve, having a replaceable valve cartridge, is installed on a cylinder and shipped empty to the filler. Filling the cylinder is achieved by means of a passageway through the spud or other nozzle into the chamber in the valve housing of the valve cartridge and through the bottom passageways of the valve cartridge and valve housing into the pressure cylinder. The sealing member is prevented from moving down by means of the force exerted on its top surface by the compression on the deformed top rim portion of the elastic sealing member. The compression exerted on the sealing member is sufficient to resist the pressure communicating through passage acting to force sealing member downward. The compressive force is such between sealing member and its top surface to maintain the valve of the valve cartridge to remain in the open position during shipment and installation. Preferably an O-ring seals the top turnable valve stem during filling to prevent any loss of product to the atmosphere during the filling process. Initially, the valve is in its open position. When the stem is turned to close from the open position, sufficient force can be applied forcing the sealing member downward allowing the compressed top rim area of the sealing member to move outward. The sealing member can then be sealed against the valve seat with sufficient load applied by means of the stem to effectively seal the pressurized contents in the cylinder. The diameter difference between the surfaces is large enough that clearance is provided for the free movement of the sealing member. When the stem is turned to open, after filling, the sealing member will move upward due to the pressure of the cylinder contents acting on the lower surface. In this way, contents can be withdrawn from the cylinder. The stem can be turned until the stop is reached of the valve body. The sealing member travel is limited by a bore surface since in the uncompressed condition, the top of the sealing member has an interference in the design such that surface cannot be diametrically compressed during its upward travel. The sealing member remains concentric by means of the bore within sealing member.

During any attempt to refill the cylinder, the following conditions will occur. Gas would enter the passageway of the spud and enter the central chamber communicating to the upper surface of the valve sealing member forcing it downwardly and sealingly against the surface due to the pressure differential between the chamber and the passage and the cylinder.

The sealing element of the invention valve cartridge does not contain any arms (flexible or otherwise) or any slots which have an opening on the top rim portion. The top rim of the invention sealing arm is not an arm. The invention sealing element is basically a body portion (without any peripheral portions which could be interpreted to be flexible, radially extending arms) with a top-mounted stem.

The invention non-refillable valve has the advantage over the non-refillable valve of U.S. Pat. No. 4,813,575 of being able, after the cylinder has been emptied (fully or even partially in some embodiments) of pressurized gas, to be placed in shape at a filling site or plant to be reused as a non-refillable valve. The invention replaceable valve cartridge allows this advantage.

Another embodiment of the invention involves the inclusion of biased valve means positioned in the central bore of the housing, below the bottom of the valve cartridge, located in the central bore of the housing. The biased valve means normally is biased in a closed position. Also, protrusion means is located on the end of housing (a) towards the biased valve means. When housing (a) is moved towards the biased valve means, the protrusion means contacts the biased valve means and forces the biased valve means into an open position. Basically, the biased (secondary) valve means is opened or closed by the longitudinal movement of the (disposable) valve cartridge. This preferred embodiment allows the removal and replacement of the valve cartridge when the cylinder still contains pressurized gas.

When the top of the valve stem contacts the inside of the retainer means, the continued outward turning of the valve stem causes the housing of the valve cartridge to be forced downward on the internal threads of the central bore of the housing and the external threads of the valve stem, thereby opening the biased valve means. In this manner the biased valve means and the valve in the valve cartridge are opened together (and, conversely, closed together, when the valve stem is screwed inward to disengage the protrusion means from the biased valve means) when there is pressurized gas in the cylinder.

A further feature of the biased valve means embodiment involves the slot in the housing wall of the housing, having at its lower end a downwardly slanted slot portion. The nozzle (b) is located in and slidable in the slanted slot portion. When nozzle (b) is moved to the lower end of the slanted slot portion, the protrusion means contacts and forces the biased valve means into the open position. When nozzle (b) is moved to the upper end of the slanted slot, the protrusion means moves upwards far enough to allow the biased valve means to return to the closed position.

The invention valve has the following features:

1. It retains the features of non-refillable U.S. Pat. No. 4,813,575.

2. It contains a secondary valve in series with the first, allowing for retention of the heel (remaining pressurized gas) without exposure or loss to the atmosphere.

3. It provides for converting the valve from non-refillable to refillable under controlled conditions.

4. It provides for an inexpensive, disposable, non-reusable part of the valve.

5. The embodiment using the secondary valve provides a safety feature in that the retainer nut could be removed under full pressure with no hazard and no loss of contents.

6. The embodiment using the secondary valve also provides two valves in series, thus reducing the potential for content loss during transportation and storage.

7. All embodiments provide full open to full closed valve conditions with a minimum number of valve turns.

8. The disposable insert results in labor savings during refill.

9. Since the valve seat in the insert is replaced at each filling, the design guarantees a new valve at each refilling with no need to inspect and refurbish a fixed valve.

10. The valve has an improved flow rate as compared to the current state-of-the-art, thus reducing filling labor costs.

11. The valve can be manufactured so as to have "keyed" inserts that fit only the permanent portion of one refiller, thus insuring return to original filler.

BRIEF DESCRIPTION OF THE DRAWINGS

The preferred embodiments of the invention are shown in the accompanying drawings.

In the drawings.

DETAILED DESCRIPTION OF THE INVENTION

Figure 1:
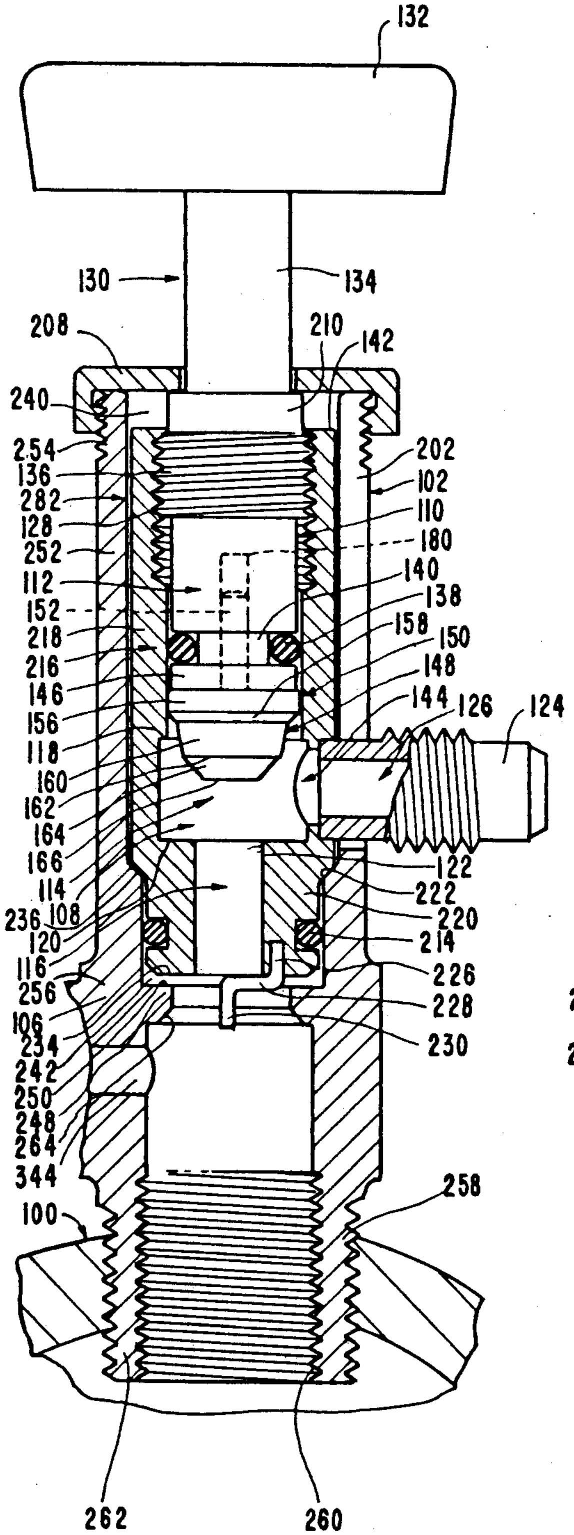
FIG. 1 is a longitudinal cross-sectional view of the non-refillable valve of the invention in its filling position.

Referring to FIG. 1, pressure container or pressure system 100 is provided with non-refillable valve 102 for the filling and selective emptying of container 100. Valve 102 can be welded, threaded or otherwise affixed to container 100, as shown in FIG. 1 (the threaded mode is shown). In FIG. 1 valve 102 is provided with housing 106 which has central bore 238. Central bore 238 communicates with the interior of container 100. Central bore 238 has upper portion or chamber 240, middle portion or chamber 242, passageway 244 and lower portion or chamber 246. Upper chamber 240 is larger in diameter than middle chamber 242. The interface between upper chamber 240 and middle chamber 242 forms flat, inwardly-slanted rim 236. Middle chamber 242 is larger in diameter than passageway 244. The interface between middle chamber 242 and passageway 244 forms flat, horizontal rim 250. Passageway 244 is smaller in diameter than lower chamber 246. The interface between passageway 244 and lower chamber 246 forms flat, outwardly-slanted rim 264. Protrusion 248 is formed between rim 250 and rim 264. Housing 106 has upper casing portion 252, middle casing portion 256 and low casing portion 258. The upper end of upper casing portion 252 is externally threaded (254). Lower casing portion 258 is externally-threaded (262) and internally-threaded (260). Middle casing portion 256 extends outwardly more than upper casing portion 252 and lower casing portion 258. The outer surface of middle casing 256 can contain a series of flat portions (e.g., hexagonal in horizontal cross-section) to allow the use of a wrench, pair of pliers and the like to screw lower casing portion 258 into and out of the internally-threaded hole in pressure container 100. Vertical slot 202, having a hemispherically shaped lower surface, is located in upper casing portion 252 and extends almost to middle casing portion 256.

Vertical passageway 344 in the side of middle casing 256 communicates with passageway 346 in arm 340, wherein safety relief valve 348 is located. Arm 340, passageway 346 and safety relief valve 348 are not shown in FIGS. 1 to 4, but are identical to the same items shown in detail in FIGS. 23 and 24.

Replaceable valve cartridge 282 fits in upper chamber 240 and middle chamber 244 of central bore 238 of housing 106 as shown in FIG. 1. Valve cartridge 282 is provided with housing 216 which has central bore 108. Central bore 108 communicates with the interior of container 100 via the lower portion of central bore 236. Central bore 108 has uppermost portion or chamber 110, upper portion of chamber 112, middle portion or chamber 114 and lower portion or chamber 116. Upper chamber 110 is smaller in diameter than middle chamber 114, and middle chamber 114 is larger in diameter than lower chamber 116. The interface between upper chamber 112 and middle chamber 114 forms flat, horizontal rim 118. The interface between middle chamber 114 and lower chamber 116 forms flat, horizontal rim 120. Slightly-rounded edge 122, formed by the interface between flat rim 120 and lower chamber 116, serves a valve seat. Side port 144 of valve housing 216 communicates with middle chamber 114. Side outlet nozzle 124 has lengthwise bore 126. Outlet nozzle 124 is positioned in side port 144 of valve housing 216 so that bore 126 communicates with the lower region of middle chamber 108. Nozzle 124 is preferably externally threaded for attachment to an external source (not shown) of a pressurized fluid, usually a pressurized gas. Any other suitable attachment means can be used to attach the external source of compressed gas to side nozzle 124. Nozzle 124 fits in vertical slot 202 in a manner such that it can be moved up and down in a vertical manner.

Housing 216 has upper wall portion 128, middle wall portion 218 and lower wall portion 220. The bottom surface (234) of lower wall portion surface is flat and horizontal. O-ring 214 is located in an O-ring groove located very near the lower end of lower wall portion 220. O-ring 214 ca be made of any suitable resilient material, such as, rubber. O-ring 214 seals middle chamber 242 from the upper portions of central bore 238. Lower wall portion 220 has a smaller diameter than middle wall portion 218. The interface between middle wall portion 218 and lower wall portion 220 forms flat, inwardly-slanted rim 222. Rim 222 mates with rim 236, as shown in FIG. 1.

Figure 10:
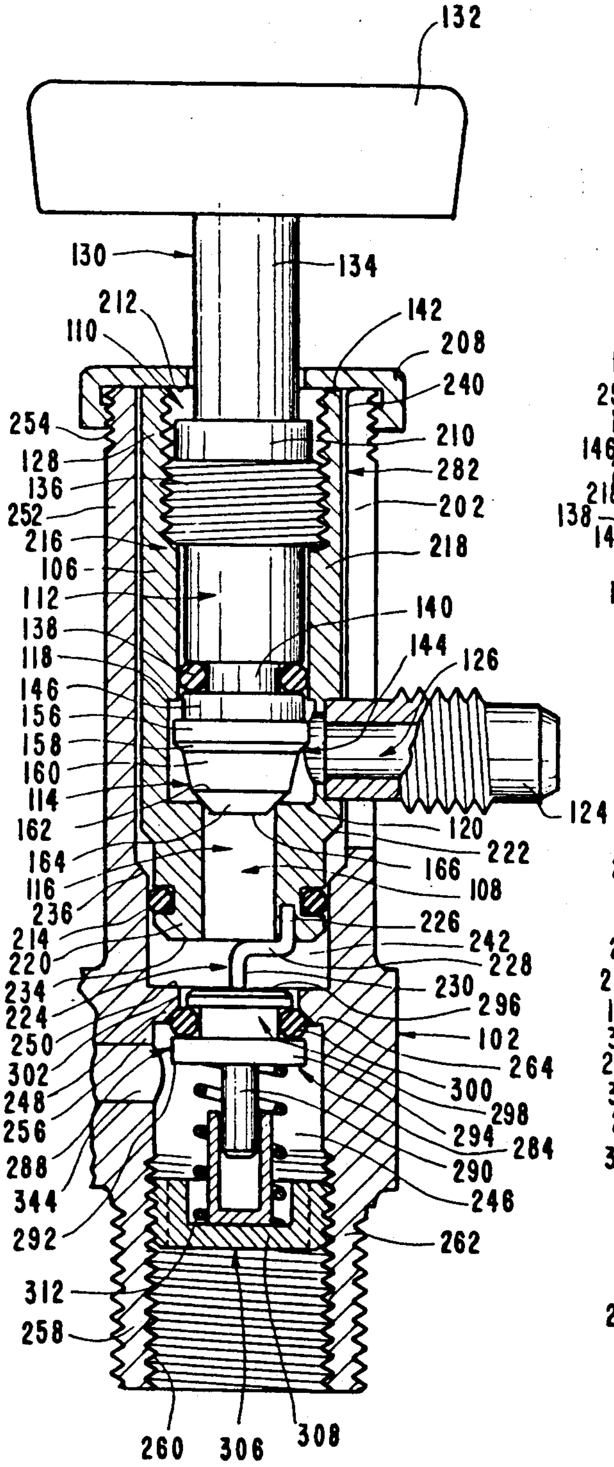
FIG. 10 is a longitudinal cross-sectional view of another embodiment of the non-refillable valve of the invention in its closed position.
Figure 11:
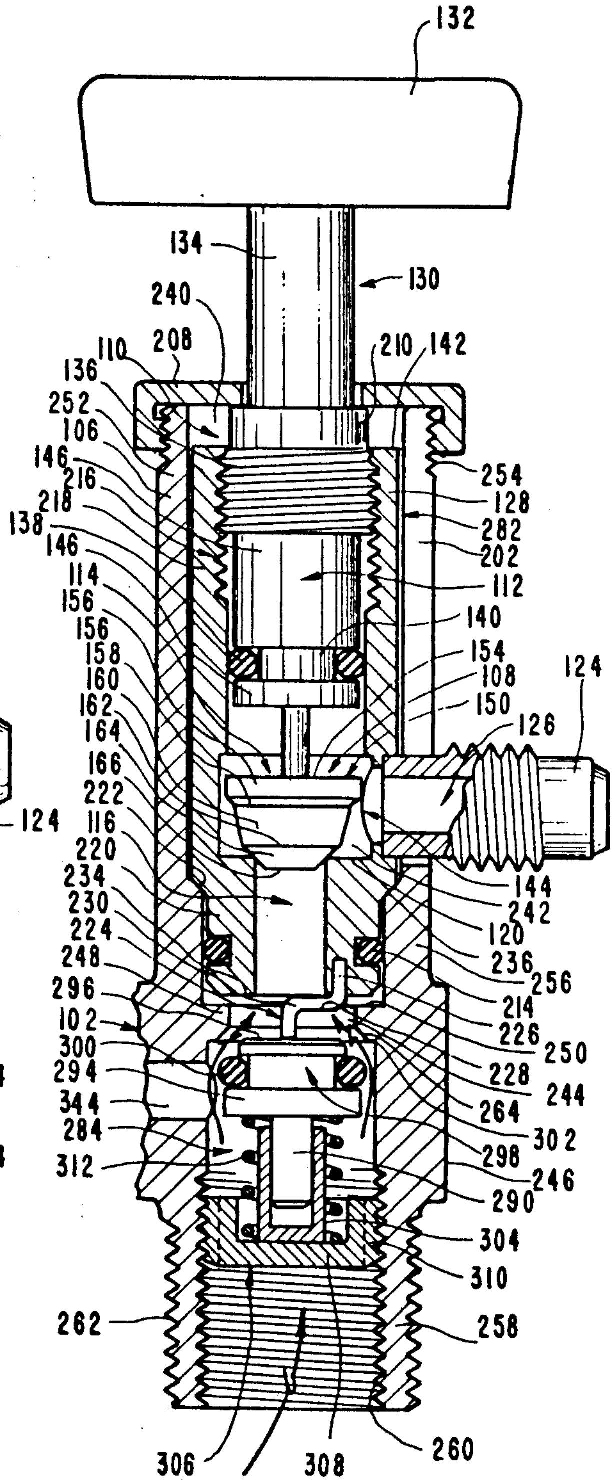
FIG. 11 is a longitudinal cross-sectional view of the non-refillable valve of FIG. 10 in its discharge position.

Upper vertical leg 226 of heel valve depressor 224 fits into vertical bore 232 (see FIG. 13), which is located in the bottom portion of lower wall portion 220. Horizontal leg 228 of heel valve depressor 224 is flush with bottom surface 234 of lower wall portion 220. Horizontal leg 228 extends to the center of lower chamber 116. Lower vertical leg 230 of heel valve depressor 234 is preferably located on the central axis of lower chamber 116. When valve cartridge 282 is in the position shown in FIG. 1, the lower end of vertical leg extends through and beyond passageway 244 in central bore 238. Vertical bore 232 best has a rectangular cross-section, as do vertical leg 226, horizontal leg 228 and vertical leg 230. In the embodiment shown in FIG. 1, heel valve depressor 224 is not a necessary feature. Heel valve depressor 224 is a necessary feature of the embodiment shown in FIGS. 10 and 11, for example. Accordingly, vertical bore 232 and heel valve depressor 224 can readily be eliminated from the embodiment of FIG. 1, but are shown therein because the lower portions of central bore in FIG. 1 are configured for valve 284 shown in the embodiment of FIGS. 10 and 11. The embodiment shown in FIG. 1 is readily made into the embodiment of FIGS. 10 and 11 by the inclusion of valve 284. The embodiment of FIGS. 10 and 11 is described in detail below. Also, the embodiment of FIG. 1 does not require the configuration of the portions of central bore below middle chamber 242 shown in FIG. 1 (e.g., middle chamber 242 can extend all of the way down central bore 238).

Wall portion 128 of housing 216 encompasses the sides of uppermost chamber 110, which has a diameter that is larger than that of upper chamber 112. Wall portion 128 can be thinner than the rest of housing 216 because it is not subjected to the force caused by the compressed gas. Wall portion 128 is internally threaded. Valve stem 130 has stem 134 and handle 132, which is mounted on the top end of stem 134. Stem 134 expands out to stem portion 210, which can be located in upper chamber 110 (see FIG. 2) or in upper chamber 240 (see FIG. 1). The bottom section of lower portion 146 of stem 134 can be positioned in middle chamber 114 when valve stem 130 is screwed downward. The central portion of stem 134 has enlarged portion 136, which is externally threaded and thereby threadingly engages the internally threaded portion of wall portion 128. In this manner and by means of handle 132, stem 134 (210 and 146) can be rotatably turned in central bore 108 so as to advance up or down in uppermost chamber 110 and upper chamber 112. O-ring 138 is mounted in O-ring groove 140 located very near the lower end of stem 134 (lower portion 146). O-ring 138 can be made of any suitable resilient material, such as, rubber. [While not preferred, upper lip 142 of wall portion 128 can be thinner than the internally-threaded portion of wall portion 128. When valve stem 130 is in place in central bore 108, upper lip 142 of wall portion 28 can be crimped over as shown in FIG. 1 so as to (form hole 212 and) restrict the upwards movement of enlarged portion 136 of stem 134. Crimped upper lip 142 would also prevent the easy removal of valve stem 130 from central bore 108 of housing 216, but then valve stem 130 would also have to be replaced when valve cartridge 282 is replaced.] In the assembly and manufacture of valve cartridge 282, stem 134 is inserted into the central hole in cap 208. Cap 208 is internally threaded and is screwed onto externally-threaded portion 254 of upper casing portion 252 of housing 106 once valve cartridge 282 has been inserted into central bore 238 of housing 106. The outer side surface of cap or retainer nut 208 can have a series of flat portions (e.g., hexagonal in horizontal cross-section) to allow the use of a wrench, pliers and the like to screw cap 208 onto or off of externally-threaded portion 254 of housing 106.

When the top of portion 210 of valve stem 130 contacts the inside of retainer nut 208, the continued downward turning of valve stem 130 causes housing 216 to be forced downward on the internal threads of upper chamber 110 of central bore 102 and external threads 136 of valve stem 130. See FIG. 4.

The internally-threaded portion of uppermost chamber 110 has a vertical dimension which is sufficiently short so that O-ring 138 is always in contact with upper chamber 112. O-ring 138 is in compression between the wall of inner chamber 112 and stem 134, thereby providing a hermetic seal between the wall of inner chamber 112 and stem 134 even against pressurized gas.

Figure 2:
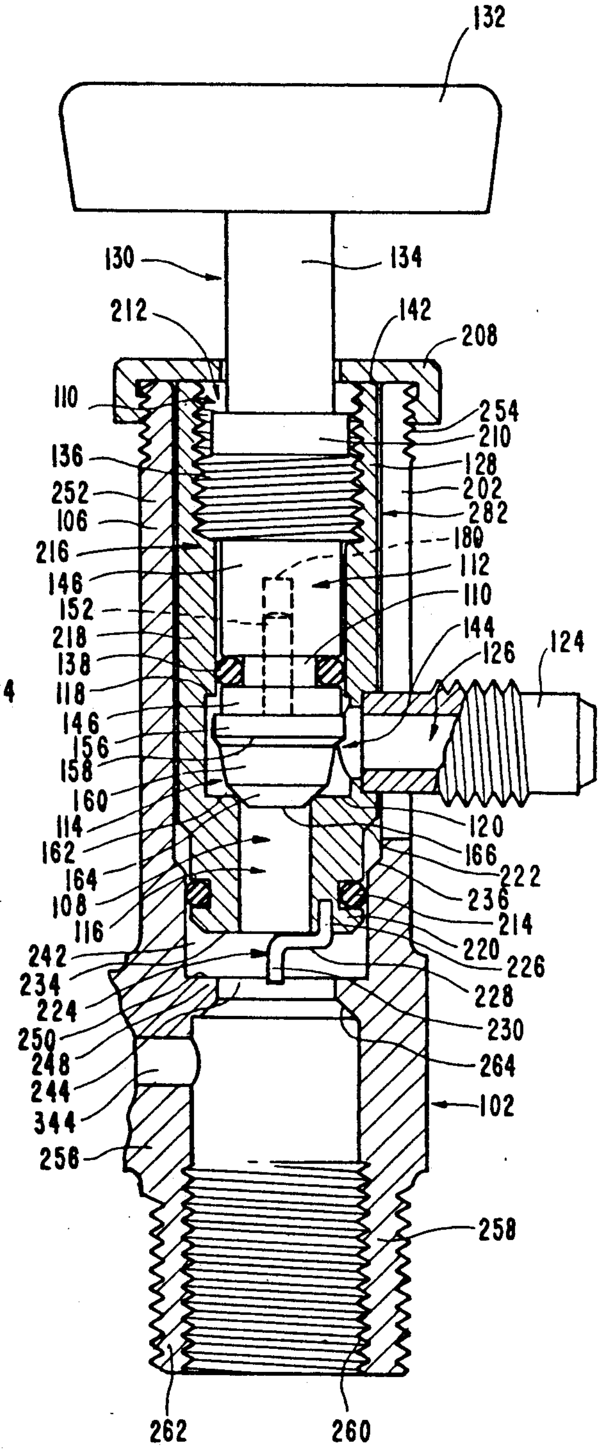
FIG. 2 is a longitudinal cross-sectional view of the non-refillable valve of FIG. 1 in its closed position, ready to use.
Figure 4:
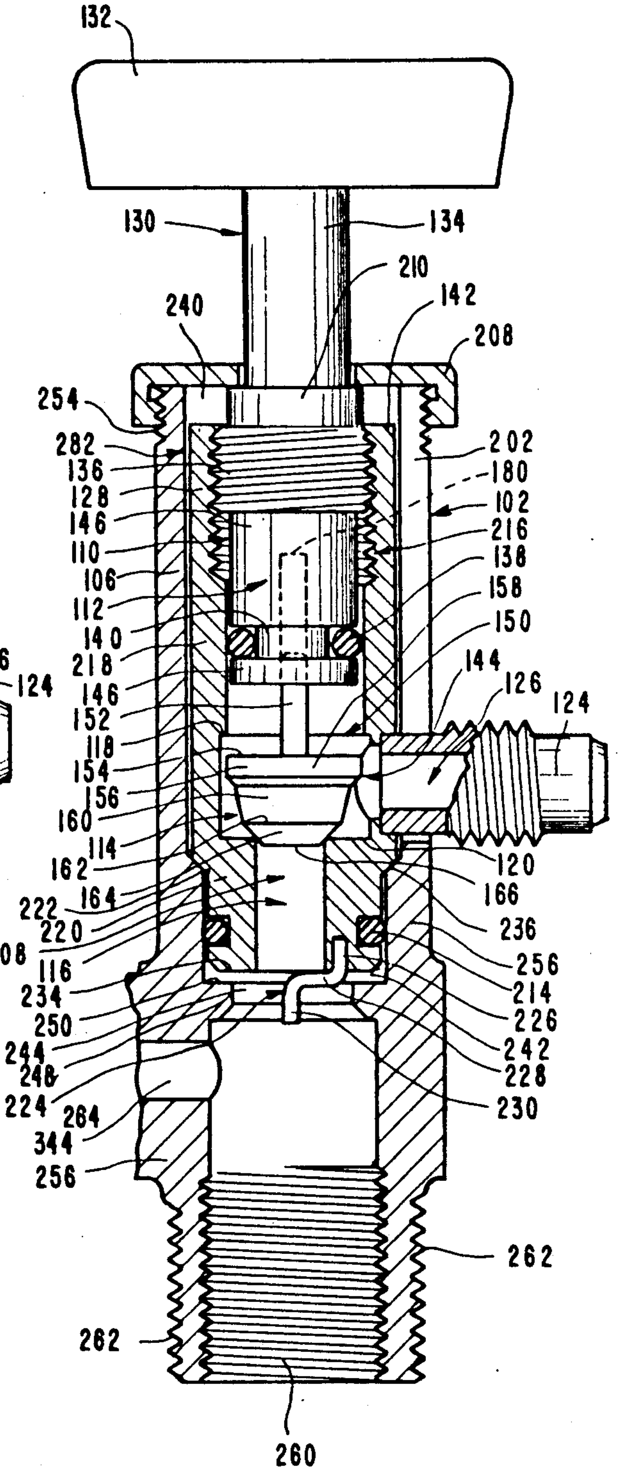
FIG. 4 is a longitudinal cross-sectional view of the non-refillable valve of FIG. 1 in its attempted refilling position, after discharge.
Figure 5:
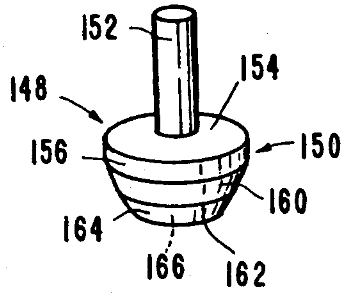
FIG. 5 is a perspective view of one version of the valve sealing member of the invention.

Referring to FIG. 5, valve sealing member 148 contains body 150 and top post 152. Body 150 contains top surface 154, upon which top post 152 is mounted (but note that valve sealing member 148 is preferably molded as a unitary object). Top surface 154 is preferably flat. Top rim 156 of body 150 has a diameter, when top rim 150 is in a non-compressed state, which is slightly less than the diameter of middle chamber 114 of central bore 108 and, when top rim 150 is in a non-compressed state, which is slightly larger than the diameter of top chamber 112. Below top rim 156 (which has a vertical face), body 150 has inwardly and downwardly slanted face 158 and then face 160, which is inwardly slanted at a greater downward angle than is face 158 (see FIG. 1). Edge 162, which is formed by the intersection of face 160 and face 164, is larger in diameter than the diameter of bottom chamber 116. Face or bottom rim 164 of body 150 is bevelled so as to be able to sealingly engage rim 122 (as shown in FIGS. 2 and 4). Bottom surface 166 of body 150 is preferably flat and has a diameter which is less than the diameter of chamber 116.

Top rim 156 fits flush against the wall of upper chamber 112 when valve sealing member 148 is located in compression in upper chamber 112—see FIG. 1. Top rim 156 preferably has a flat vertical face, but its vertical face can have other shapes, such as, an outward facing angle or curve. The diameter across the top of body 150, when it is in a non-compressed state, is larger than the diameter of upper chamber 112—see FIG. 3.

Figure 3:
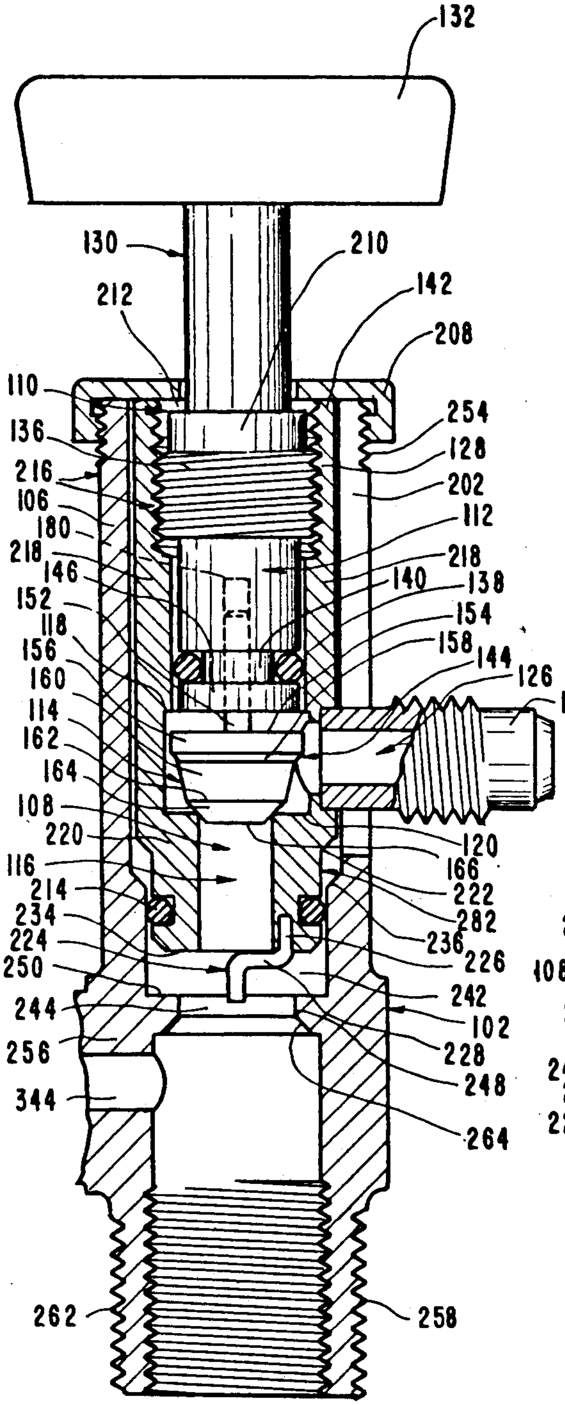
FIG. 3 is a longitudinal cross-sectional view of the non-refillable valve of FIG. 1 in its discharge position.

Top pin 152 slidingly fits in bottom bore 180 of stem 134. Bore 180 is located in the bottom portion of stem 134. Top pin 152 rotatably fits in bore 180 of body 150. The fit of bore 180 and top pin 152 is close but readily allows top pin 152 to travel up and down in bore 180 as shown in FIG. 3. As shown in FIG. 1, bore 180 does not extend all of the way through portion 146 of stem 134.

Figure 6:
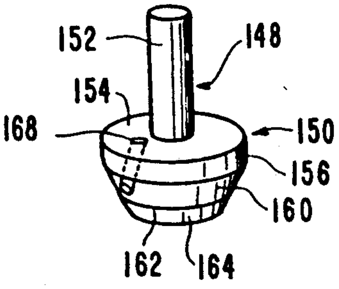
FIG. 6 is a perspective view of another version of the valve sealing member of the invention.

Referring to FIG. 6, passageway 168 in body 150 extends from face 160 to top surface 154 of body 150. While the presence of passageway 168 is neither essential nor most preferred in the invention, any entrapped fluid between the top of body 150 and the bottom of stem 134 can readily exit via passageway 168 (as when stem 134 is inserted during assembly of valve 102).

Valve sealing member 148 is made of compressible, but resilient material, or in other words, an elastic material. Valve sealing member 148 is preferably made of a resilient or elastic plastic. Cap 208 and stem 130 are permanent parts of valve cartridge 282.

To assemble valve cartridge 282, valve sealing member 148 is inserted into uppermost chamber 110 with top pin 152 pointing upwards. Stem 134 is inserted into central bore 108 so that bottom bore 180 fits over top pin or post 152. Valve stem 130 is used to force valve seating member 148 into upper chamber 112. Sealing element 148 is made of a material which is slightly resilient, e.g., a plastic material, which allows such blocking element to be force fit into constriction region 112 in central valve bore 108. Slanted face 158 helps pass sealing member 148 into upper chamber 112. As sealing member 144 moves into upper chamber 112, the threaded part of expanded portion 136 of stem 134 engages the threaded part of wall portion 128 of housing 106. At this point, handle 132 can then be turned to easily force sealing member 148 and O-ring 138 into upper chamber 112. Expanded portion 136 is moved entirely within the threaded part of wall portion 128. The various parts are then in the open-valve position shown in FIG. 1. At this point in time, top rim portion 156 of sealing member 148 is compressed inwardly. As top rim portion 156 is resilient or elastic, top rim portion 148 exerts a force against the surface of upper chamber 112 and thereby prevents sealing member 148 from falling into middle chamber 114 (even if valve cartridge 282 is dropped before being inserted into central bore 230 of housing 106, or even if assembled valve 102 is dropped before being attached to container 100).

To assemble valve 102, replaceable cartridge 282 is inserted into central bore 238 of housing 106 as shown in FIG. 1. Nozzle 124 slides down slot 202 in housing 106. Slanted rim 222 contacts slanted rim 236. Cap 208 is screwed into the top of housing 106. Stem 134 has to have been downwards at least far enough that the top of stem portion 210 allows cap 208 to be tightly screwed onto housing 106.

In operation, non-refillable valve 102 is initially in the open, ready-for-filling position shown in FIG. 1. The compressed gas flows from its source through bore 126, middle chamber 144, lower chamber 116, middle chamber 242, passageway 244 and lower chamber 246, and into pressure vessel 100. The buildup of gas pressure forces valve cartridge 282 upwards in central bore 238 so that the cap of crimped-over upper lip 142 is pressed against cap 208--see FIG. 2. O-ring prevents the pressurized gas in the middle chamber 242 from passing into upper chamber 240. Once pressure container 100 is filled, knob 132 is screwed inwardly to force sealing member 148 completely into middle chamber 114. In this manner the effect of compressed top rim portion 156 can be overcome. Once sealing member 148 is in middle chamber 114, compressed top rim portion 156 resiliently returns to its original non-compressed size (and shape). Since the diameter across top rim portion 156 is greater than the diameter of upper chamber 112, sealing member 148 cannot reenter upper chamber 112. Any upwards pull on or pressure against sealing member 148 would not cause the reentry of sealing 148 into upper chamber 112 (an exceptionally large upwards pulling force would end to damage top rim portion 156). If valve stem 130 is removed, it is still basically impossible to remove sealing member 148 out of central bore 108. The size of sealing member 148 is made large enough so that it cannot move more than a few degrees from its vertical axis even if valve stem 130 has been removed from central bore 108. If replaceable valve cartridge 282 is removed from central bore 238, there is also no way to refill container 100.

FIG. 2 shows valve 102 in the closed position after container 100 has been filled. To allow the controlled discharge of some of the contents of container 100, knob 132 is screwed outwardly as far as necessary to allow the rate of discharge desired. See FIG. 3. O-ring 214 is accordingly moved downwards in central bore 236 by the outward movement of valve stem 130. Sealing member 148, via post 152, can freely move up and down in bore 180 when valve stem 130 is in the up or open position. (When the top of portion 210 of valve stem 130 contacts the inside of retainer nut 208, the continued downward turning of valve stem 130 causes housing 216 to be forced downward on the internal threads of upper chamber 110 of central bore 102 and external threads 136 of valve stem 130.) To stop discharge of the contents of container 100, valve screw 136 is screwed downwards to place sealing member 148 back in the closed or sealing position shown in FIG. 2.

After the pressurized gas has been completely discharged from container 100, non-refillable valve 102 automatically prevents any refilling or reuse of container 100. Refilling after the partial discharge of pressurized gas or an attempt to insert a further amount of pressurized gas to an already filled container 100 is automatically prevented by valve sealing element 148. FIG. 4 illustrates how valve 102 prevents refill with pressurized gas. Let us say that valve stem 130 has been screwed outward as far as it will go. (Slanted rim 222 is in contact with slanted rim 226, and the top of stem portion 210 extends through passageway 212 and is in contact with cap 208.) In this position sealing member 148 can freely move up and down in the end of valve stem 130 and in middle chamber 114. Usually container 100 is in an upright position and sealing member 148 is in contact with seat 122. When a person tries to refill container 100, the pressurized gas can readily enter the space above sealing member 148 via passageway 168 (e.g., FIG. 6) and around the edge of top rim 156. Passageway 168 is optional and is not necessary for the operation of the invention. Thereby, the force acting on the top of sealing member 148 is greater than the force acting on the bottom of sealing member 148 because the exposed area on top of sealing member 148 is greater than the exposed area on the bottom surfaces of sealing member 148. This keeps sealing member 148 forced against seat 122. Even if container 100 is turned upside down or placed on its side so that sealing member 148 is not in contact With sealing edge 122, a suction is created in middle chamber 114 and bottom chamber 116 by the stream of compressed gas which pulls sealing member 148 against sealing edge 122 when one attempts to refill container 100 via outlet nozzle 124.

Referring to FIG. 4, note that the lower opening of passageway 168, if present, would lie above seat 122. Accordingly, passageway 168 could not be used to slowly refill container 100.

O-ring 132 and sealing member 148 are usually the only non-metallic parts (possible also knob 132) and they should be made of materials which are chemically resistant to the compressed fluid used in container 100. The rest of the parts of valve 102 would be made of a metal, such as, brass, or a very strong metal, such as, steel. Stainless steel should be used if the pressurized gas is corrosive, wherever the corrosive gas can come in contact with parts of valve 102. Typically, housing 106 is brass or stainless steel, handle 132 is plastic, and cap 208 and stem 134 (210 and 146) are brass One of the important features of the invention is the location of outlet nozzle 124 (i.e., bore 126) in the lower portion of middle chamber 114 below top rim 156 of sealing member 148 when sealing member 148 is in the fill position (as shown in FIG. 1). In such arrangement, sealing member 148 does not interfere with the compressed gas flow path into container 100 during the filling operation. Of course, this assumes that the height of bottom chamber 116 is of sufficient magnitude to keep bottom surface 166 of sealing member 148 a reasonable distance above seat 122.

When sealing member 148 is seated on rim 122, top surface 154 of sealing member 148 is preferably in the same or just above the longitude plane passing through the top of bore 126 of side nozzle 124. This arrangement easily allows the entering compressed gas to reach the area above sealing member 148.

Bottom surface 166 of sealing member 148 helps to provide a large area on the bottom surfaces of sealing member 148 during discharge. Bottom surface 166 is hidden to gas pressure during any attempt at refilling container 100 once sealing means 148 has seated (due to the larger top surface of sealing means 148 even including the vertical force rector on bevelled surface 164).

Replaceable valve cartridge 282 is a disposable unit. This feature has certain advantages. When valve cartridge 28 is in place as in FIG. 1, valve sealing member 148 is in a position which allows cylinder 100 to be filled with pressurized gas at a filling site or plant. After partial or complete emptying of the pressured gas from cylinder 100, the user cannot refill cylinder 100. This means that cylinder 100 is non-refillable in the field. Cylinder 100 must be returned to a filling site or plant. Replaceable valve cartridge 282 is removed from housing 106 (and disposed of) and a new replaceable cartridge 282 (having sealing member 148 in the filling position) is inserted into housing 106 (and cap 208 screwed tightly on) to allow refilling of cylinder 100 at the filling site or plant. An advantageous feature of the invention is that valve stem 132 does not have to be replaced and can be used again.

Figure 7:
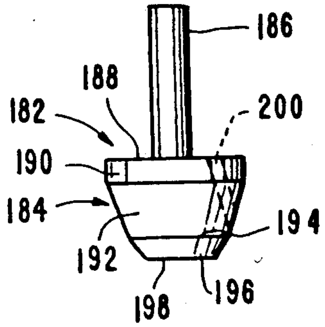
FIG. 7 is a perspective view of a further version of the valve sealing member of the invention.

Referring to FIG. 7, valve sealing member 182 is an alternative to valve sealing member 148 and is easier to mold. Valve sealing member 182 contains body 184 and top post 186. Body 184 contains top surface 188, upon which post 186 is mounted. Top surface 188 is preferably flat. Top rim 190 of body 184 has a diameter, when top rim is in a non-compressed state, which is slightly less than the diameter of middle chamber 114 of central bore 108 and which is slightly larger than the diameter of top chamber 112. Below top rim 188 (which has a vertical face), body 184 has inwardly and downwardly slanted face 192. Edge 194, which is formed by the intersection of face 192 and face 196, is larger in diameter than the diameter of bottom chamber 116 Face or bottom rim 196 of body 184 is bevelled so as to be able to sealingly engage rim 122. Bottom surface 198 of body 184 is preferably flat and has a diameter which is less than the diameter of chamber 116. Optional passageway 200 in body 184 extends from face 192 to top surface 188.

Figure 8:
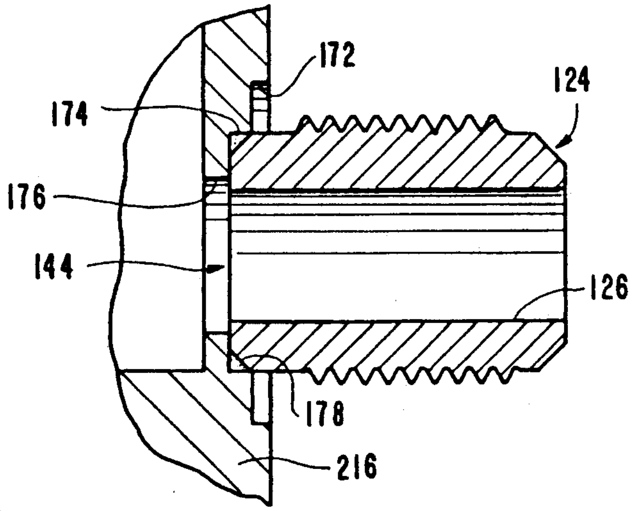
FIG. 8 is a fragmentary cross-sectional view of one version of the side port of the valve of the invention.

FIG. 8 shows a very preferred embodiment of side outlet nozzle 124 (which is the embodiment shown in FIGS. 1 to 4). Side port 148 is located in the bottom of middle chamber 114. Side port 148 has stepped portions 172, 174 and 176, each having a larger diameter than the next inwardly stepped portion. Side outlet nozzle 124 contains horizontal bore 126, which communicates with middle chamber 114 via stop portion 176 of side port 148. The end (180) of nozzle 124 is bevelled. The diameter of nozzle 124 is such that it snugly fits within middle step portion 174 with bevel 180 not extending past the interface of step portion 174 and 176. Nozzle 124 can be welded to housing 216 utilizing the ring groove formed by step portion around nozzle 124.

Figure 9:
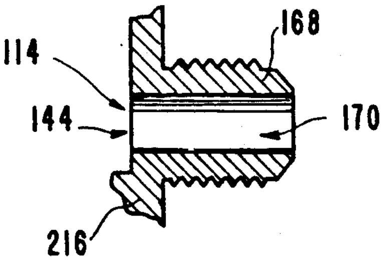
FIG. 9 is a fragmentary cross-sectional view of another version of the side port of the valve of the invention.

FIG. 9 shows side outlet nozzle 168 formed as a unitary part of housing 216. Side outlet nozzle 168 contains horizontal bore 170.

The use of separate outlet nozzle 124 provides increased ease of manufacture and assembly and increased costs savings over the embodiment shown in FIG. 9.

Valve cartridge 282 of the embodiment of non-refillable valve 102 shown in FIGS. 1 to 4 can be removed by unscrewing cap 208. If there is still pressurized gas in container 100, valve cartridge 282 may be forced out of central bore at high speed the instant that ca 208 is unscrewed. (It is possible to correlate the dimensions so that O-ring disengages middle chamber 242 before cap 208 is fully unscrewed, thereby dissipating some of the gas pressure before cap 208 disengages.) The embodiment of the invention non-refillable valve 102 shown in FIGS. 10 and 11 eliminates such problem (by means of bottom valve 284) and, accordingly, is more preferable than the embodiment of FIGS. 1 to 4.

The embodiment of non-refillable valve 102 of FIGS. 10 and 11 is structurally the same as the embodiment of FIGS. 1 to 4 except for the inclusion of bottom valve 284 and the inclusion of heel valve depressor 224 (which is not required in the embodiment of FIGS. 1 to 4). As described herein, some functions and movements differ.

Figure 12:
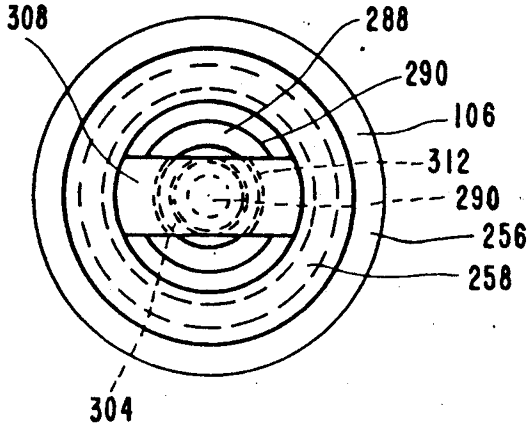
FIG. 12 is a bottom elevational view of the non-refillable valve of FIG. 10.

Referring to FIG. 10, bottom valve 284 includes valve sealing member 286, which contains body 288 and bottom post 290. Body 288 contains bottom surface 292 upon which bottom post 290 is mounted (but note that valve sealing member 284 is preferably molded as a unitary object). Bottom surface 292 is preferably flat. Body 288 has bottom rim 294. Body 288 has top surface 296, which is preferably flat. Top rim 294 of body 288 is slanted; below the slanted portion is vertical face portion 302. O-ring groove 298 is located in body 288 between vertical face portion 302 and bottom rim 294. O-ring 300 is mounted in O-ring groove 298. O-ring 300 and O-ring groove 298 are located in body 288 so that O-ring 300 contacts slanted face 264 of protrusion 248 so as to form a seal. Slanted face 264 acts as a valve seat. Bottom post 290 slidably fits in cup 304. Bottom support 306 (see FIG. 12) has bottom rectangular plate 308 with raised ends 310. The use of rectangular bottom plate 308 allows gas flow around bottom support 306. The outer edge of each raised end 310 is hemispherical in horizontal cross-section and is externally threaded. The bottom of cup 304 is mounted in the center of bottom plate 308. Spring 312 is mounted around cup 304 and bottom post 290, with one end in contact with bottom plate 308 and the other end in contact with the bottom of body 288. Spring 312 upwardly biases body 288 so that O-ring 300 is normally forced against valve seat 264. In the closed position of valve cartridge 282, as shown in FIG. 10, heel valve depressor 224 is not in contact with top surface 296 of 288. Accordingly, bottom valve 284 is in its closed position with O-ring 300 in sealing contact with valve seat 264. The compressed gas cannot pass out of cylinder 100. Accordingly, valve cartridge 282 can be removed and replaced even with cylinder 100 still containing compressed gas. FIG. 11 shows the ready to be discharged position of valve cartridge 282. Stem 130 has been fully screwed upward and valve sealing member 148 is seated. Housing 106 is in its downward position so that heel valve depressor 224 has depressed (downwardly biased) bottom valve 284. This means that O-ring 300 is not engaged with valve seat 264. Compressed gas can pass around bottom valve 284 and raise valve sealing member 148 to allow discharge thereof out of nozzle 124. When the top of portion 210 of valve stem 130 contacts the inside of retainer nut 208, the continued downward turning of valve stem 130 causes housing 216 to be forced downward on the internal threads of upper chamber 110 of central bore 102 and external threads 136 of valve stem 130 whereby spring-biased bottom valve 284 is forced open via heel valve depressor 224. The pressurized gas in the cylinder causes valve 150 (in valve cartridge 282) to have the two valves open together and close together, by the action of heel valve depressor 224, when pressurized gas is in the cylinder.

Vertical passageway 344 in the side of middle casing 256 communicates with passageway 346 in arm 340, wherein safety relief valve 348 is located. Arm 340, 346 and safety relief valve 348 are not shown in FIGS. 10 and 11, but are identical to the same items shown in detail in FIGS. 23 and 24.

Figure 13:
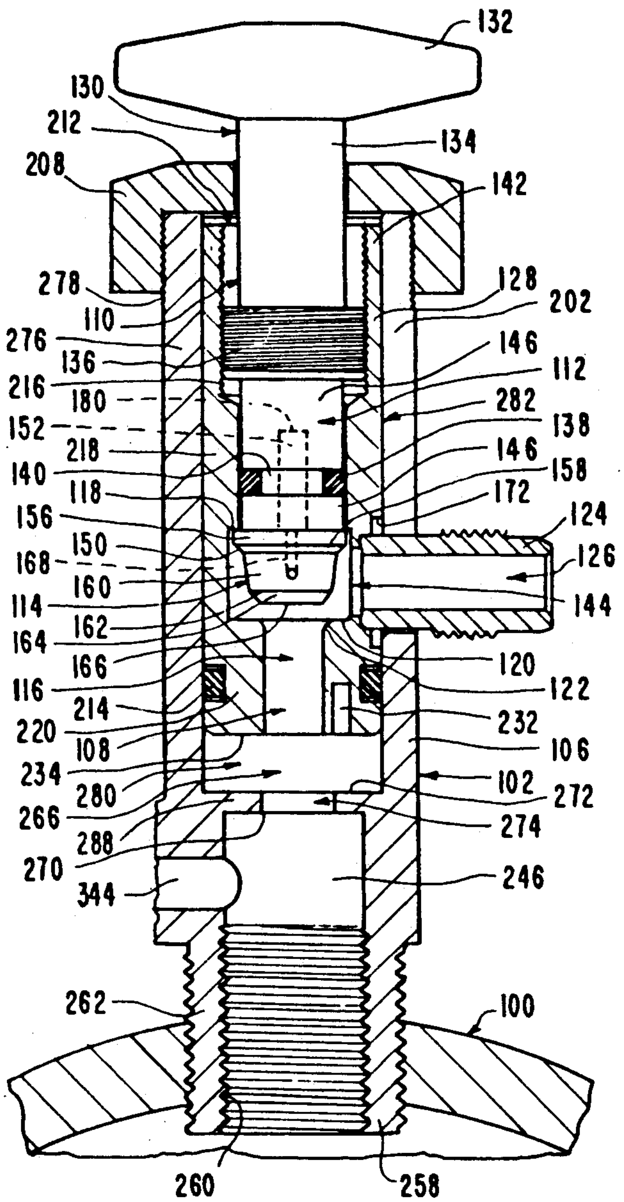
FIG. 13 is a longitudinal cross-sectional view of another embodiment of the non-refillable valve of the invention in its ready to discharge position.
Figure 14:
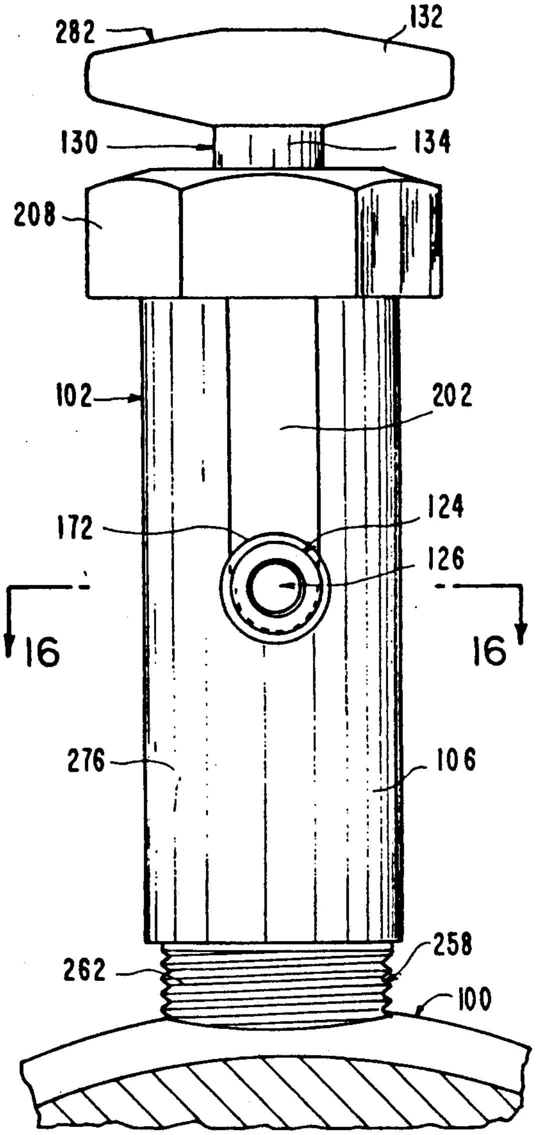
FIG. 14 is a side elevational view of the non-refillable valve of FIG. 13.
Figure 15:
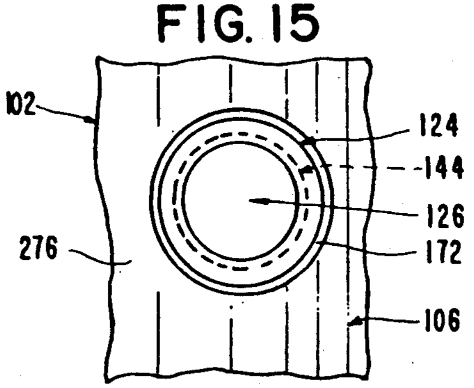
FIG. 15 is a partial, side elevational view showing the nozzle of the non-refillable valve of FIG. 14.
Figure 16:
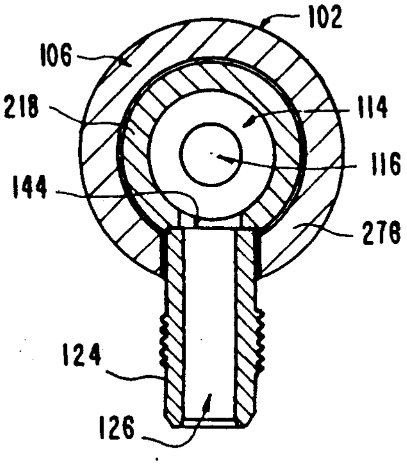
FIG. 16 is a latitudinal cross-sectional downward view of the non-refillable valve along line 16—16 in FIG. 14.
Figure 17:
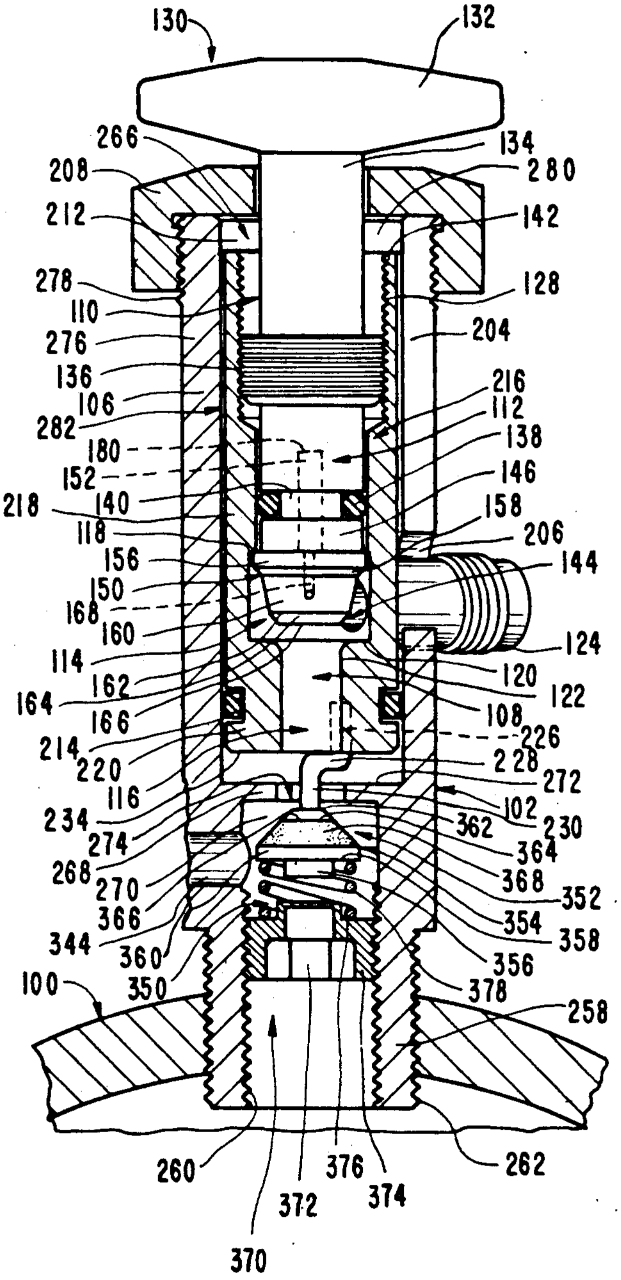
FIG. 17 is a longitudinal cross-sectional view of a further embodiment of the non-refillable valve of the invention in its discharge position.

The embodiment of non-refillable valve 102 of FIGS. 13 to 16 is similar to non-refillable valve 102 of FIGS. 1 to 4. The present valve 102 has protrusion 268 in place of protrusion 248. Protrusion 268 has a rectangular shape in the vertical cross-section. Lower edge 270 can serve as a valve seat (see the embodiment of FIG. 17). While the present valve 102 contains vertical slot 232 in the bottom of housing 102, it is not necessary since heel valve depressor 224 is not required in this embodiment Central bore 236 of the present embodiment does not contain any reduced-diameter middle chamber 242 (with upper chamber 240 extending all of the way to protrusion 274). Housing 216 of the present embodiment does not contain any reduced-diameter lower portion 220 (with upper portion 276 extending all of the way to the bottom of housing 216). These features of this embodiment reduce the cost of fabrication of the present valve 102. The downward movement of the present valve cartridge 282 is stopped by nozzle 124 contacting the bottom of slot 202. FIG. 13 shows this embodiment of valve 102 in the discharge position. The filling, closed and non-refillable positions are readily ascertainable from comparison with FIGS. 1 to 4. A side elevational view of this embodiment is shown in FIG. 14. FIG. 16 is a side elevational view into nozzle 124. FIG. 16 is a horizontal cross-sectional view along lines 16—16 in FIG. 14. When the top of portion 210 of valve stem 130 contacts the inside of retainer nut 208, the continued downward turning of valve stem 130 causes housing 216 to be forced downward on the internal threads of upper chamber 110 of central bore 102 and external threads 136 of valve stem 130 whereby spring-biased bottom valve 284 is forced open via heel valve depressor 224. The pressurized gas in the cylinder causes valve 150 (in valve cartridge 282) to have the two valves open together and close together, by the action of heel valve depressor 224, when pressurized gas is in the cylinder.

Vertical passageway 344 in the side of middle casing 256 communicates with passageway 346 in arm 340, wherein safety relief valve 348 is located. Arm 340, 346 and safety relief valve 348 are not shown in FIG. 13, but are identical to the same items shown in detail in FIGS. 23 and 24.

The embodiment of the invention non-refillable valve shown in FIGS. 17 to 22 is very similar to the embodiment of FIG. 13. The main differences ar that the present valve 102 includes bottom valve 350, heel valve depressor 224 and a different configuration of slot 204. Bottom valve 350 includes valve sealing member 352, which contains body 354 and bottom post 356. Body 354 contains bottom surface 358 upon which bottom post 356 is mounted (but note that valve sealing member 352 is preferably molded as a unitary object). Bottom surface 358 is preferably flat. Body 354 has bottom rim 360. Body 354 has top surface 362, which is preferably flat. Face 364 is outwardly and downwardly slanted. O-ring groove 366 is located in face 364. O-ring 368 is mounted in O-ring groove 366. The outer face of O-ring 366 is flat and slanted to conform to the surface of face 364. O-ring 368 and O-ring groove 366 are located in body 354 so that O-ring 368 contacts lower edge 270 of protrusion 274 so as to form a seal. Bottom support 370 has central bore 372 in housing 374. Housing 374 is externally threaded. The top rim (376) of housing 374 around central bore 372 is raised. Spring 378 is mounted around top rim 374 and bottom post 356, with one end in contact with housing 374 and the other end in contact with the bottom of body 354. Spring 376 upwardly biases body 354 so that O-ring 368 is normally forced against valve seat 270. Compressed gas can pass through central bore 372 and around depressed body 354 to allow discharge thereof out of nozzle 124.

Figure 18:
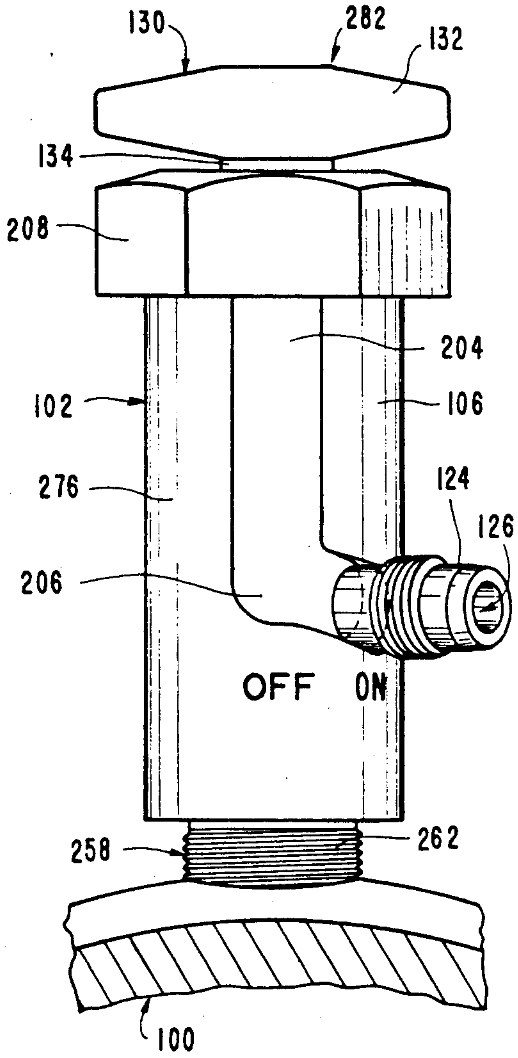
FIG. 18 is a side elevational view of the non-refillable valve of FIG. 17 in its discharge position (designated "ON")
Figure 19:
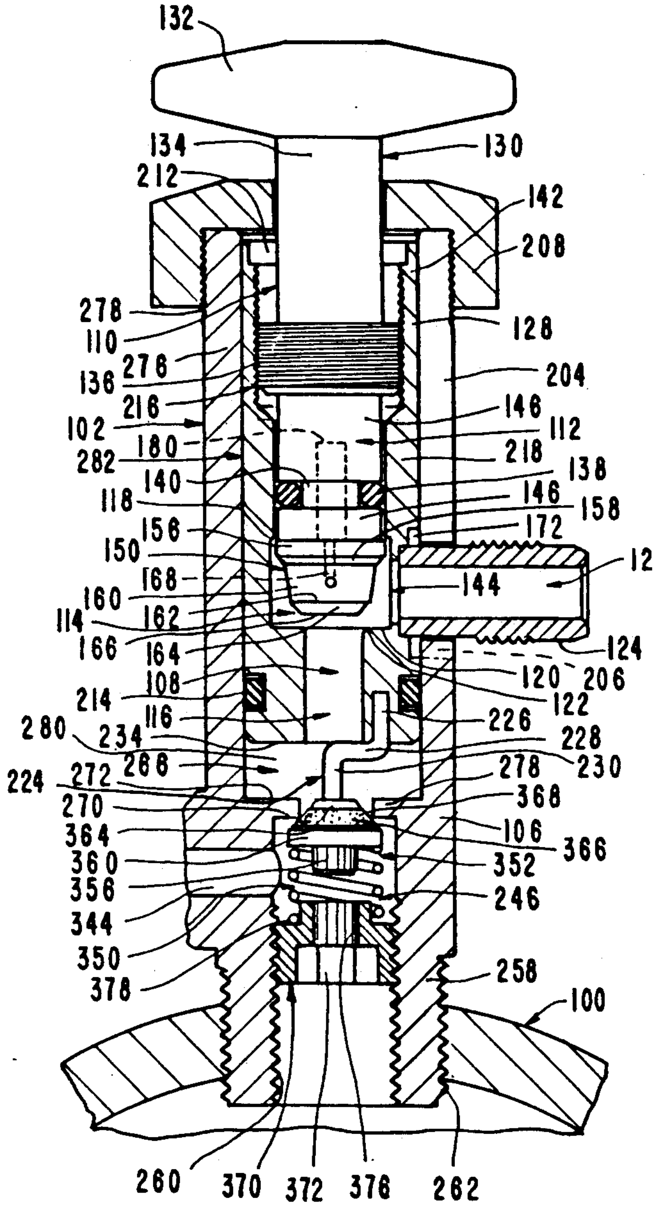
FIG. 19 is a longitudinal view of the non-refillable valve of FIG. 17 in its closed portion.
Figure 20:
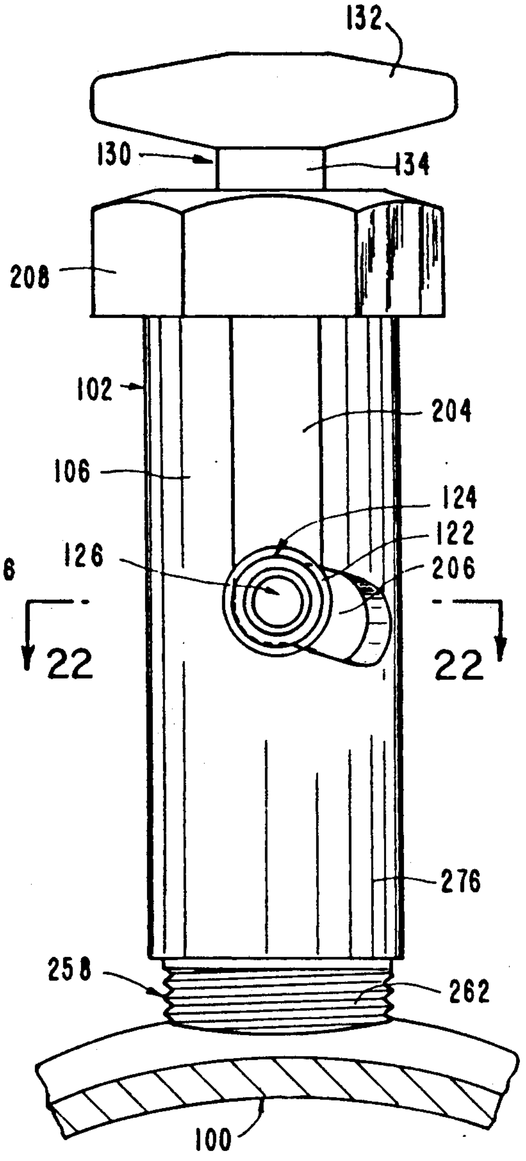
FIG. 20 is a side elevational view of the non-refillable valve of FIG. 17 in its closed position (designated "OFF")

As shown in FIG. 18, nozzle 124 can be moved back and forth in slot leg 206 of slot 204 in housing 106. Slot leg 206 is downwardly slanted. When nozzle 124 is moved to the lower end of slanted slot 206, protrusion leg 230 contacts and forces biased bottom valve 350 into the open position. This is termed the "ON" position—see FIGS. 17 and 18. When nozzle 124 is moved to the upper end of slanted slot 206, protrusion leg 230 moves upwards far enough to allow biased bottom valve 350 to return to the closed position. This is termed the "OFF" position—see FIGS. 19 and 20. When the top of portion 210 of valve stem 130 contacts the inside of retainer nut 208, the continued downward turning of valve stem 130 causes housing 216 to be forced downward on the internal threads of upper chamber 110 of central bore 102 and external threads 136 of valve stem 130 whereby spring-biased bottom valve 284 is forced open via heel valve depressor 224. The pressurized gas in the cylinder causes valve 150 (in valve cartridge 282) to have the two valves open together and close together, by the action of heel valve depressor 224, when pressurized gas is in the cylinder.

Vertical passageway 344 in the side of middle casing 256 communicates with passageway 346 in arm 340, wherein safety relief valve 348 is located. Arm 340, 346 and safety relief valve 348 are not shown in FIGS. 17 and 19, but are identical to the same items shown in detail in FIGS. 23 and 24.

Figure 21:
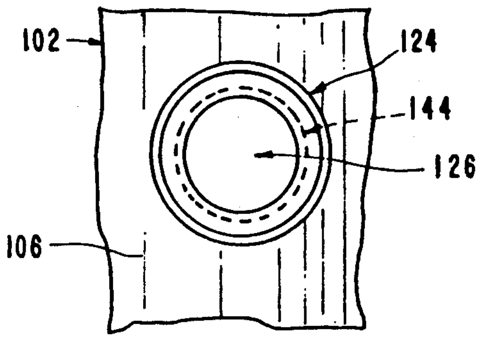
FIG. 21 is a partial, side elevational view showing the nozzle of the non-refillable valve of FIG. 17.
Figure 22:
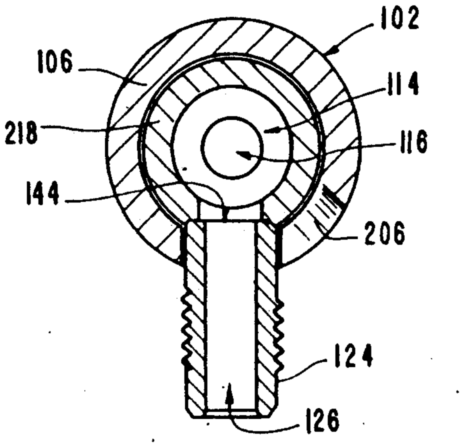
FIG. 22 is a latitudinal cross-sectional downward view of the non-refillable valve along line 22—22 in FIG. 17.

FIG. 21 is a side elevational view into nozzle 124. FIG. 22 is a horizontal cross-sectional view along lines 22—22 in FIG. 20.

Figure 23:
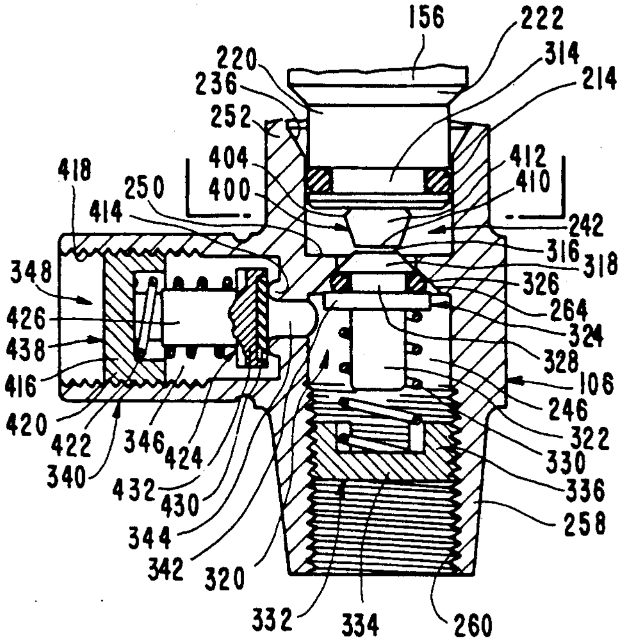
FIG. 23 is a partial, longitudinal cross-sectional view of the bottom valve region of another embodiment of the non-refillable valve of the invention in its closed position.

Referring to FIG. 23, the embodiment shown therein is basically the same in structure as the embodiment of FIGS. 10 and 11. The major difference is the inclusion of safety relief valve 348. Arm 340 contains passageway 346, which communicates with lower chamber 246 via passageway 344 in portion 256 of housing 106. Safety relief valve 348 is positioned in passageway 346. Bottom casing portion 258 is not externally threaded and its outer surface is inwardly and outwardly slanted. Bottom valve 320 contains body 324 and bottom post 322. Body 324 has top surface 316, which is preferably flat. Face 318 slants outwardly and downwardly from top surface 316. Body 324 has bottom rim 342. O-ring groove 328 is located in body 324 between face 318 and bottom rim 342. O-ring 326 is mounted in O-ring groove 328. Bottom support 332 (which is similar to bottom support 306) has bottom plate 336, which is generally rectangular, with raised ends 336. The inner and outer edges of each raised end 336 are circular in horizontal cross section. Each raised end 336 is externally threaded. Spring 330 is mounted loosely around bottom post 322 and fits tightly into a receptacle formed by raised ends 336 of bottom support 332. Spring 330 upwardly biases body 324 so that O-ring 326 is normally forced against valve seat 264. In the closed position of valve cartridge 282, as shown in FIG. 23, leg 230 of heel valve depressor 224 is not in contact with top surface 316 of body 324. Accordingly, bottom valve 320 is in its closed position with O-ring 326 in sealing contact with valve seat 246. The compressed gas cannot pass out of cylinder 100. Accordingly, valve cartridge 282 can be removed and replaced even with cylinder 100 still containing compressed gas. FIG. 18 shows the ready to be filled position of valve cartridge 282. Stem 130 has been fully screwed upward and valve sealing member 148 is seated. Housing 106 is in its downward position so that heel valve depressor 400 has depressed (downwardly biased) bottom valve 284. This means that O-ring 326 is not engaged with valve seat 264. Compressed gas can pass around bottom valve 284 and raise valve sealing member 148 to allow discharge thereof out of nozzle 124.

Figure 24:
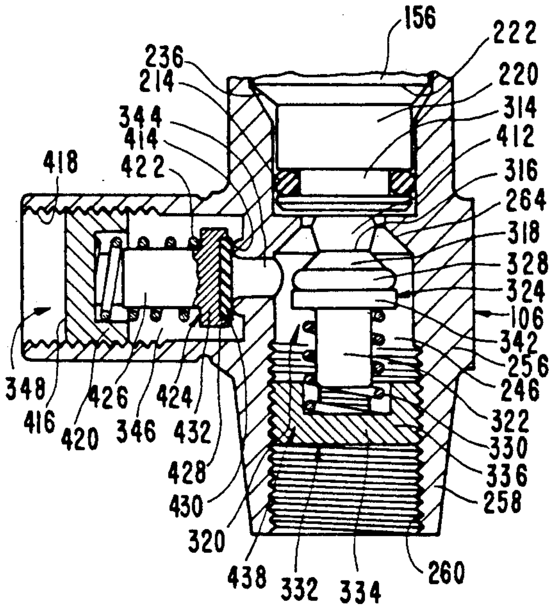
FIG. 24 is a partial, longitudinal cross-sectional view of the bottom valve region of the non-refillable valve of FIG. 23 in its discharge position.

Safety relief valve 348 can be any of the conventional safety relief valves used for valves for pressurized gas cylinders. The preferred version is shown in FIGS. 23 and 24 in the closed position. Safety relief valve 348 contains body 424 and bottom support 438. Body 424 has top disc 432 and bottom post 416. Resilient disc 430 fits in a circular depression in the top of top disc 432 formed by run 428. Bottom support 438 (which is similar to bottom supports 332 and 306) has bottom plate 416, which is generally rectangular, with raised ends 420. The inner and outer edges of each raised end 420 are circular in horizontal cross section. Each raised end 420 is externally threaded. Spring 422 is mounted loosely around bottom post 416 and fits tightly into a receptacle formed by raised ends 420 of bottom support 438. Spring 422 biases body 424 (i.e., resilient disc 430) so that it is normally forced against valve seat 414. Valve seat 414 is the protruding outer rim of passageway 344.

Figure 25:
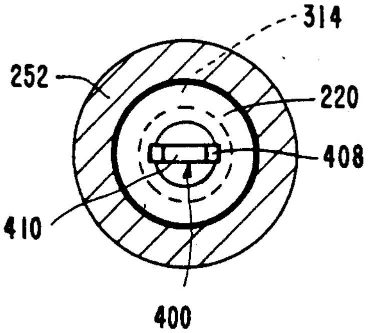
FIG. 25 is latitudinal cross-sectional upward view of the non-refillable valve along line 25—25 in FIG. 23.
Figure 26:
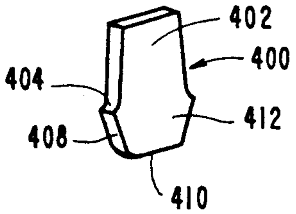
FIG. 26 is a perspective view of the preferred embodiment of the heel valve depression.

FIG. 25 is a bottom cross-sectional view along line 25—25 in FIG. 23 which shows heel valve depressor 400 in place in lower chamber 116 of central bore 110. As shown in FIG. 26, heel valve depressor has lower body portion 410 and upper body portion 402, the end intersections of which form lips 404. The top area of upper body portion 402 is smaller in horizontal dimension than lower chamber 116. The two side, vertical edges of upper body portion 402 stand down and outward so that lips 404 lie outside of the vertical diameter of lower chamber 116. This allows heel valve depressor to be wedged into the bottom end of lower chamber 116 as shown in FIG. 23.

Figure 27:
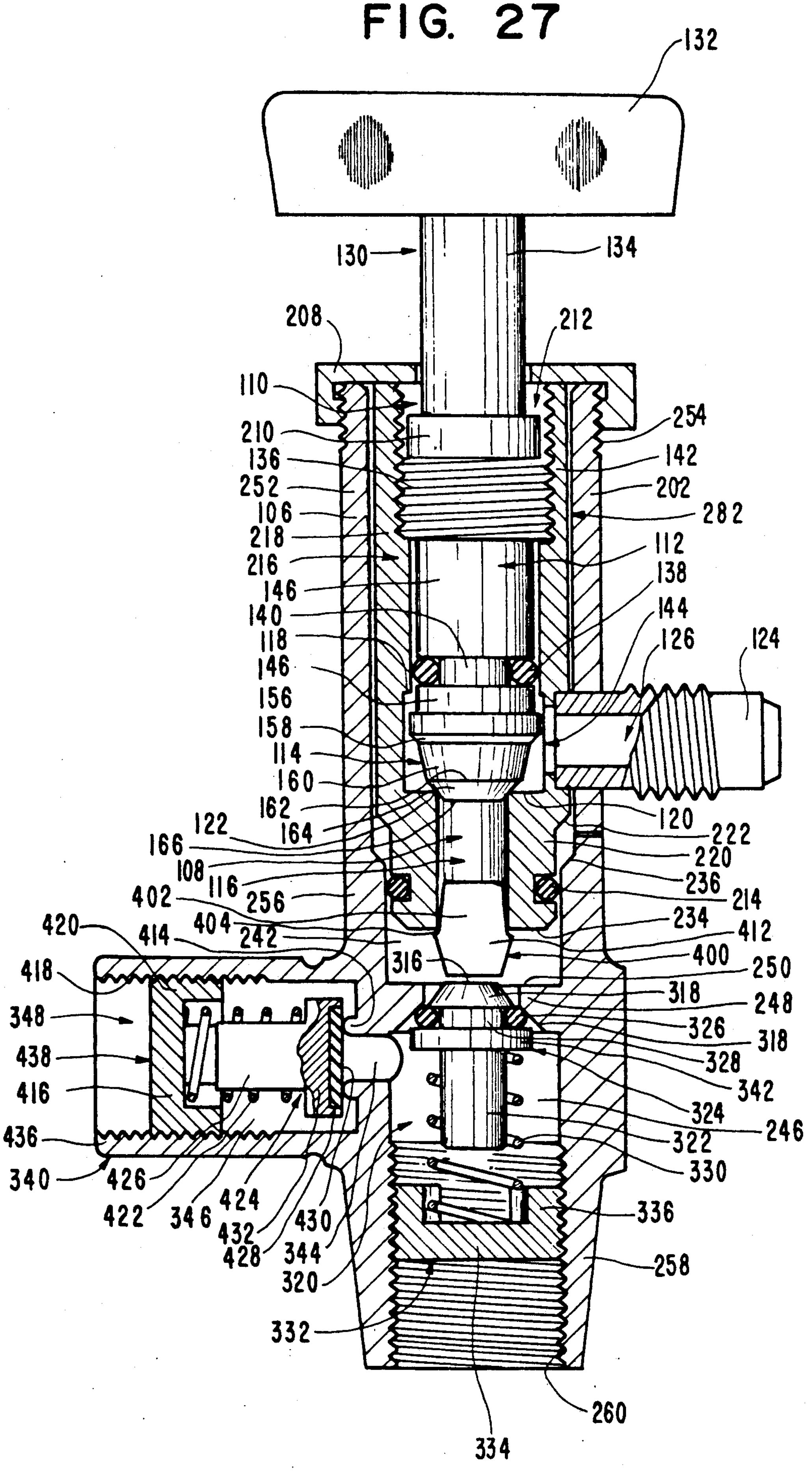
FIG. 27 is a longitudinal cross-sectional view of a particularly preferred embodiment of the non-refillable valve of the invention in its closed, ready to use, non-refillable position.
Figure 31:
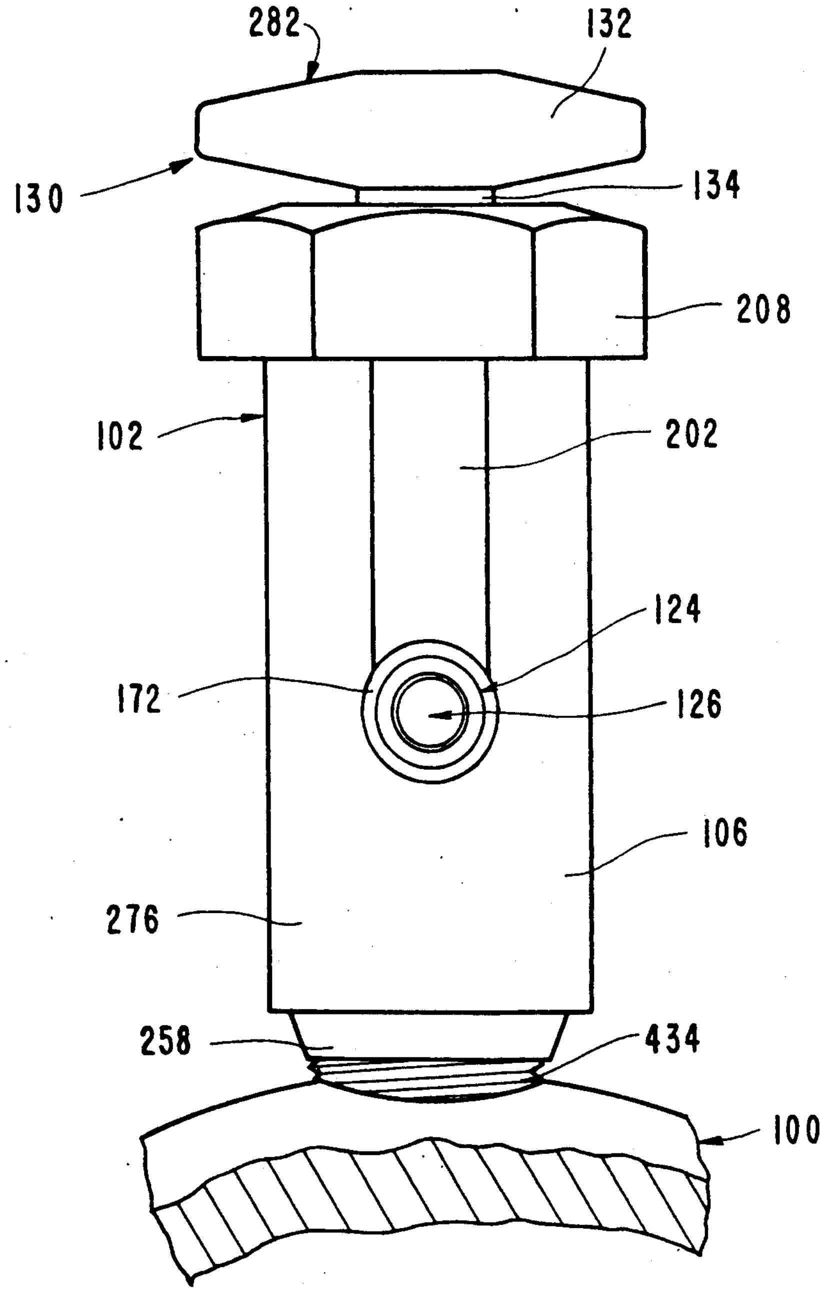
FIG. 31 is a side elevational view of the non-refillable valve of FIG. 27 with its cartridge in the down position.

The embodiment of the invention shown in FIGS. 27 and 31 is particularly preferred. The embodiment of the invention non-refillable valve shown in FIGS. 17 to 22 is very similar to the embodiment of FIGS. 10 and 11. There are differences in that the present valve 102 uses heel valve depressor 400 (instead of heel valve depressor 224 and receptacle hole 232). Also the lower portion of the present non-refillable valve is identical to the embodiment shown in FIGS. 23 and 24. As shown in FIG. 27, nozzle 124 can be moved up and down in slot 202 in housing 106. When nozzle 124 is moved to the lower end of slot 202, heel valve depressor 400 contacts and forces biased bottom valve 320 into the open position. When nozzle 124 is moved to the upper end of slot 202, heel valve depressor 400 moves upwards far enough to allow biased bottom valve 320 to return to the closed position. When the top of portion 210 of valve stem 130 contacts the inside of retainer nut 208, the continued downward turning of valve stem 130 causes housing 216 to be forced downward on the internal threads of upper chamber 110 of central bore 102 and external threads 136 of valve stem 130 whereby spring-biased bottom valve 284 is forced open via heel valve depressor 400. See FIG. 18. The pressurized gas in the cylinder causes valve 150 (in valve cartridge 282) to have the two valves open together and close together, by the action of heel valve depressor 400, when pressurized gas is in the cylinder.

Figure 28:
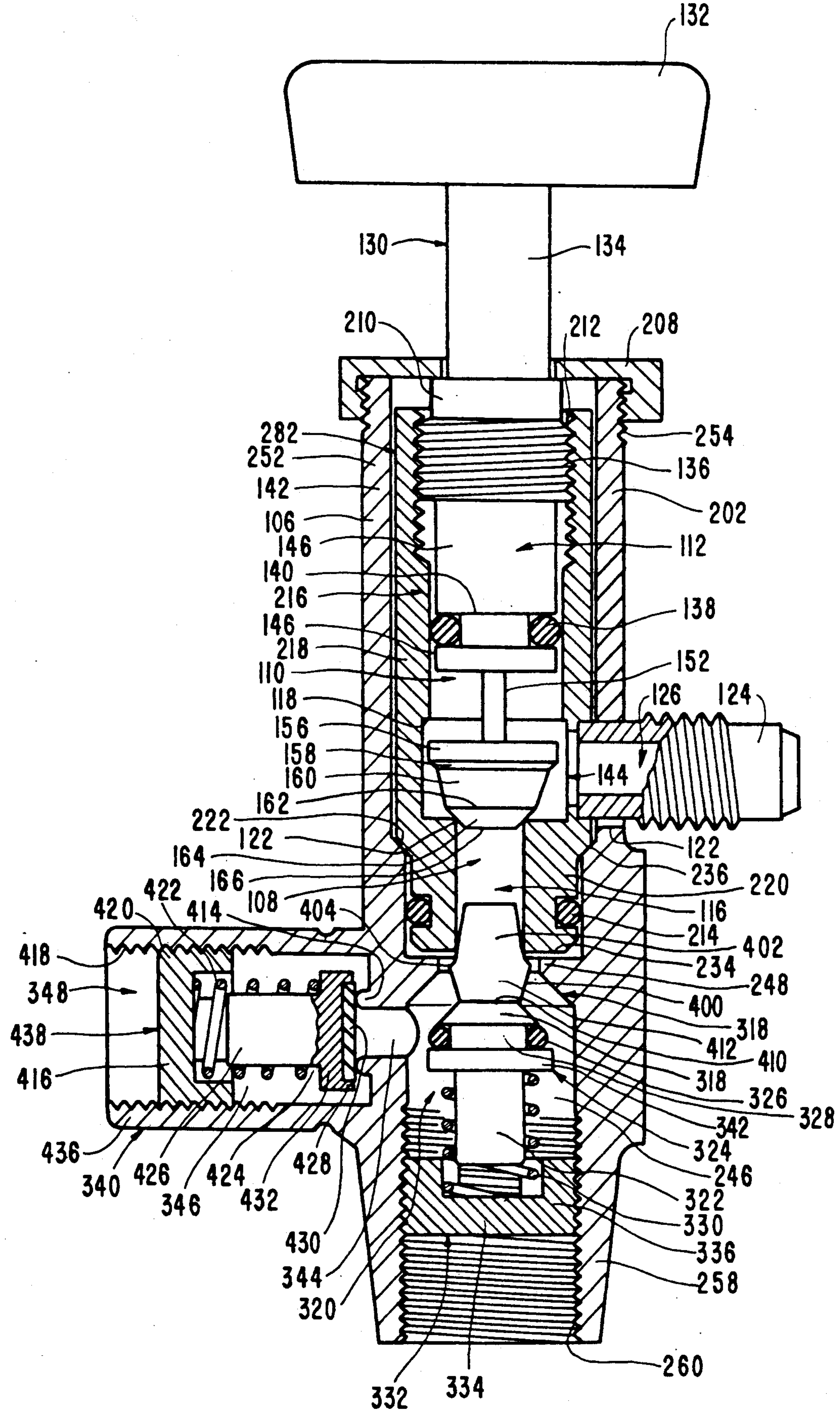
FIG. 28 is a longitudinal cross-sectional view of the non-refillable valve of FIG. 27 in its attempted refilling position, after discharge.
Figure 29:
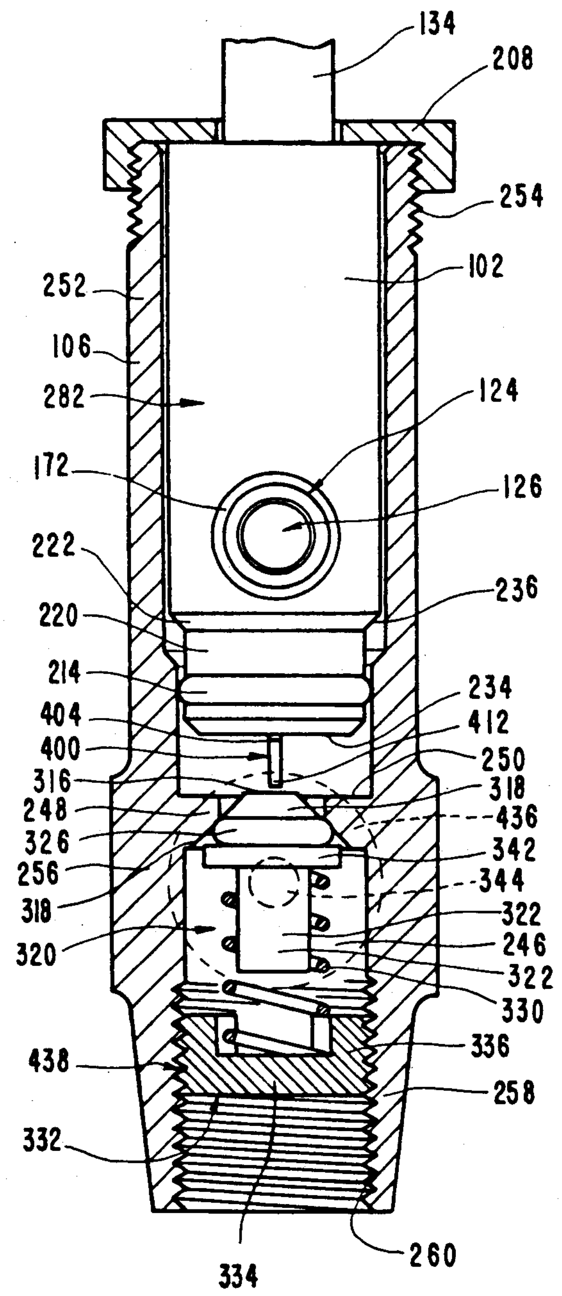
FIG. 29 is a partial longitudinal cross-sectional view of the non-refillable valve of FIG. 27 in its closed position, ready to use.
Figure 30:
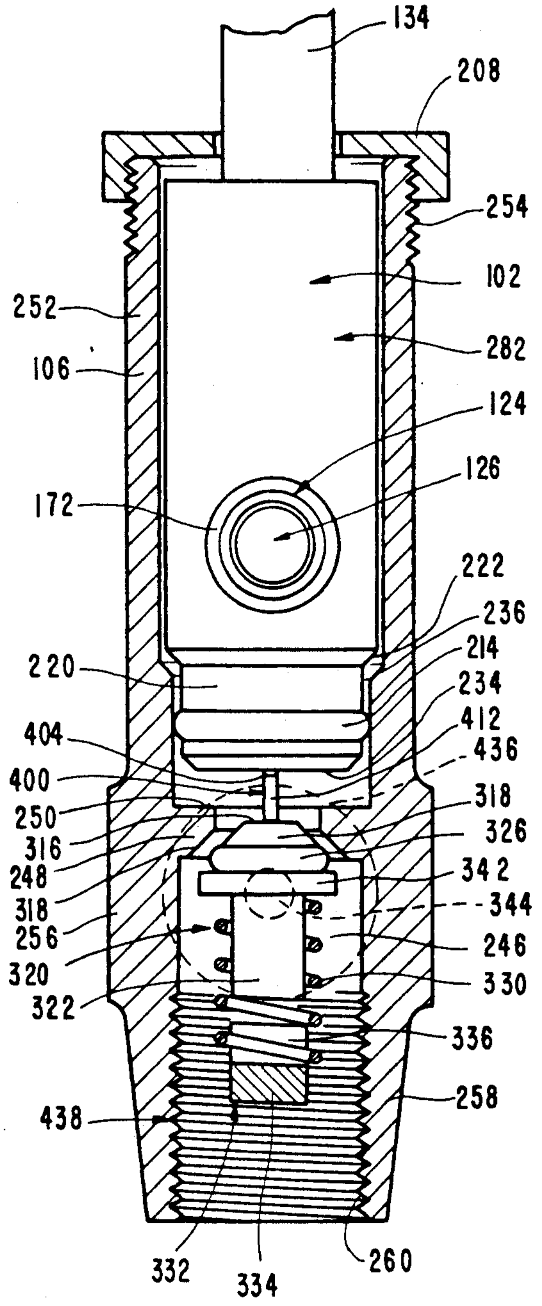
FIG. 30 is a partial longitudinal cross-sectional view of the non-refillable valve of FIG. 27 in its discharge position.

FIG. 27 shows the non-refillable valve in its closed position. FIG. 28 shows biased valve 320 in its open position - if pressurized gas is present in cylinder 100, it will valve float 148 into an open position. FIGS. 29 and 30 are similar to FIGS. 27 and 28, respectively, without cartridge valve 282 being in cross-section. FIG. 31 shows the non-refillable valve in its closed position where float valve 148 is forced closed even though biased valve 320 is in its open position.

Although the invention non-refillable valve has been primarily described above for compressed gas containers, the invention non-refillable valve can be used with pressure fluid containers, such as, pressurized liquid containers.

The valve and blocking element are configured such that the blocking element can be irreversibly moved to a position in which the valve permits escape of fluid under pressure exerted from the inside of the container, but which automatically closes in response to exposure to an external pressure greater than the pressure inside the container. The valve cartridge itself is formed of a valve housing, and a stem to open and close the valve. The stem is configured to force the blocking element from the initial to the final location.

The material out of which the blocking element is made is not critical, although it must be sufficiently flexible so as to allow for compression of flexion while in the constricted portion, and then re-expansion when finally positioned in the final location. Resilient plastics are preferred, provided such plastics are inert to the pressurized gas used in the container.

The invention valve does not encompass the valve cartridge entry side port being located above the constricted portion of the valve control bore where the sealing element does not contain any bypass holes. The use of the invention valve with a top side port (with sealing elements which do not contain any bypass holes) would be inoperable because the sealing element is initially in the compressed state in the constricted region of the valve central bore and, therefore, the container could not be filled. The pressurized gas would have no unblocked path from the upper located side port into the container. If the pressurized gas forced the compressed blocking element out of the constricted region, initial filling would then be blocked. (The use of a sealing element with at least one bypass hole, i.e., which is not a slot and which does not extend into the seating portion of the sealing element, would be a very impractical embodiment because filling would be very slow unless the holes were relatively quite large.)

The non-refillable valves of U.S. Pat. No. 4,573,611 (O'Connor) and U.S. Pat. No. 4,543,980 rely upon valve sealing members (or valve blocking members) which have at least one flexible arm extending from the body element thereof. Such flexible arms represent a potential weakness in such non-refillable valves.

Generally the sealing element of Patent '611 or Patent '980 cannot be returned to its initial position in or above the constriction in the central bore of the valve body. Someone could remove the valve stem and try to pull the sealing element upwards using needle nose pliers or the like by means of the top post on the sealing element. Removal of the valve stem allows the sealing element to be moved off of the vertical axis to try to manipulate one of the arms into the constriction. Regarding Patent '611, someone could insert a rod into the side nozzle and try to push the sealing element upwards by means of leverage pressure or the like. The slots between the arms means that the circumference of the blocking element might be compressed sufficiently by the pushing or pulling pressure. It is unlikely that such attempts would be successful because the upper ends of arms of the blocking element fit against the bottom side of the constriction in the central bore. This potential problem is minimized with the sealing element of the invention because the invention sealing element does not contain any arms on the slots therebetween.

The pushing or pulling force on the sealing element of Patent '611 or Patent '980 during an attempt to force the sealing element into or above the constriction in the central bore may damage the flexible arms or cause the breaking of part or all of one of the flexible arms. Any arm, or portion thereof, broken off could readily prevent the proper operation of the valve. If the sealing element was forced into or above the constriction and the valve was refilled, the broken arm or arm portion could interfere with the complete closure of the valve after usage. The slow leakage of a flammable gas could be extremely dangerous. This potential problem is minimized with the sealing element of the invention because the invention sealing element does not contain any arms or the slots therebetween.

The blocking element of the invention provides substantial performance features over the use of a ball-shaped blocking element. A resilient ball-shaped blocking element is far easier to force up into the constriction.

The absence of any slots in the blocking element results in making the non-refillable valve easier to mold the resilient blocking element. The sealing elements of Patent '611 and Patent '980, which are designed with slots, make it difficult to assure that the flash at the slotted areas can be eliminated. Flash is extruded plastic which could become loose during the operation of the valve, causing interference with the proper function of operation of the valve. Additionally, the flash could possibly fall off and become entrained in the fluid being dispensed and result in a clogged expansion valve of the refrigeration system (for example). The invention blocking part, as designed without slots, allows better control of dimensions of the compression diameter of the sealing element when assembled. The modified sealing element provides an improvement in design during use over the prior art slotted blocking elements.

Some of the advantages of the invention valve over the top port embodiments of U.S. Pat. No. 4,543,980 are discussed herein. The following are some of the advantages of the invention approach of using a side port located below the blocking element during filling:

1. The overall height is approximately the same as current standard valves in use. This is important to avoid the redesign of handles and cartons, and avoids increased cost regarding such matter.
2. The top port design of Patent '980 by its nature restricts the flow during the filling and increases the costs to fill the cylinder—this is not a problem with the invention valve.

In every specific embodiment, the valve of Patent '980 accomplishes filling through an entrance port which is always above the blocking element. Even in the description of FIG. 3 of Patent '980, the entrance of filling takes place above the blocking element. The disadvantage of this arrangement occurs because the flow of the filling gas must pass around the outer perimeter or through the vanes of the blocking element, and when the cylinder discharges, gas flow is through the vanes. Use of the invention closure element in the drawings of Patent '980 would prevent filling (unless the top post of the closure element was force fit, for example, into the vertical passageway in the valve stem).

Concerning the invention valve:

1. The blocking element of the invention valve is above the filling port during the filling operation providing unrestricted flow.
2. The design by its nature allows for a minimum height without redesign of the container handles or cartons and the manufacture of the valve.
3. The valve design is such that during the discharge of the cylinder the flow is less restricted allowing maximum discharge rate as opposed to the Van der Sanden valve.
4. It is obvious when the benefits of fill rate, economics, and the ability to provide the industry with a valve without a handle or carton redesign that the invention valve is substantially distinct from the valve of Patent '980.
5. The replaceable valve cartridge allows the non-refillable valve, once emptied of pressurized gas, to be converted at a filling site or plant back into a state in which it can be refilled with pressurized gas at the filling site or plant (while remaining a non-refillable valve after having been refilled by the filling site or plant).
6. The use of a biased valved in the central bore of the valve housing below the valve cartridge allows replacement of the valve cartridge even when the cylinder still contains pressurized gas.

The disclosure of Patent '980 is not limited to a blocking element having a top post which slidably fits into the valve stem. FIG. 7 thereof shows a blocking element with flexible arms and without a top post, but the stabilizing effect of the top post is replaced with a bottom hollow rod (which slides in the bottom chamber of the valve central bore). Such embodiment still requires flexible arms.

Although the invention has been described with reference to some preferred embodiments it is not intended that the broad scope of the herein-described non-refillable valve of the invention be limited thereby but that some modifications and variations are intended to be included within the spirit and scope of the invention as defined by the following claims.

What is claimed is:

1. Non-refillable valve for a pressure container, comprising:

(A) a housing, having an upper end and a lower end, having a central bore thereby forming a housing wall, and having a slot, in the housing wall, which extends from the top of the housing to a position down the housing, the lower end of said housing being adapted to sealingly engage said pressure container in a manner which provides communication between said pressure container interior and the contents therein and said lower portion of said central bore; and (B) a replaceable valve cartridge, the replaceable valve cartridge being positioned in a slidable and removable manner in the central bore of housing (A), the replaceable valve cartridge comprising:

(a) a housing, having a central bore which has a lower portion that is narrower than the middle portion of said central bore and which has an upper portion that is narrower than the middle portion of said central bore, and having a side port which communicates with the lower region of said middle portion of said central bore, said central bore, via said portion, communicating with said lower portion of said central bore of housing (A);

(b) a nozzle, having a bore therein which communicates with the atmosphere, said nozzle being positioned on the side of said housing (a) and being in communication with said middle portion of said central bore via said side port in said housing (a); said nozzle extending through the lower portion of said slot in said housing wall of housing (A), said nozzle being slidable in said slot;

(c) valve stem means positioned in said upper portion of said central bore in a rotatable manner which advances the valve stem means back and/or forth in said central bore, said valve stem means having a threadable connection with said upper portion of said central bore, said valve stem means containing a centrally-located bore in the bottom portion thereof, the central axis of said bore being coaxial with the central axis of said upper portion of said central bore of said housing;

(d) retaining means having a passageway therein, the upper portion of said valve stem means (c) being slidably and/or rotatably positioned in said passageway, said retaining means (b) being detachably affixed to the upper end of said housing wall of housing (A); and (e) a resilient valve sealing member which has a body portion and which has a post positioned on the top of said body portion, said post slidingly engaging said bore in said valve stem means (c), said body portion having a top rim portion which has a lateral dimension which is larger than the lateral dimension of said upper portion of said central bore of said housing (a) and which is less than the lateral dimension of the middle portion of said central bore of said housing (a), said body portion having a bottom seating portion which is capable of seating at or on the interface of said middle portion and bottom portion of said central bore of said housing (a), said top rim portion being continuous such that it does not contain any indentations, slots, or gaps, and said body portion not containing any arms, said top rim portion of said valve sealing member (e) being compressingly positioned in said upper portion of said central bore when said valve is inactive or being filled, said valve sealing member (e) being pushed into said middle portion by means of said valve stem means (c) when said valve cartridge (B) is placed in the active position, said valve sealing member (e) being seated against said interface between said middle and lower portions of said central bore when said valve cartridge (B) is closed, said valve sealing member (e) being positioned in said middle chamber above said seating interface when said valve cartridge (B) is used for discharge of said container contents, and said valve sealing member (e) sealingly engaging said seating interface when refill of said container with pressurized fluid is attempted, housing (a) being forced upwards in the central bore of housing (A) when said container contains pressurized gas, when the top of valve stem means (c) contacts the inside of retainer means (d), the continued outward turning of valve stem means (c) causes housing (a) to be forced downward on the internal threads of the central bore of housing and the external threads of valve stem (c), valve cartridge (B) being removable so that it can be replaced when said container is to be refilled with pressurized gas.

2. The non-refillable valve of claim 1 wherein the slot in housing (A) has a longitudinal orientation.

3. The non-refillable valve as claimed in claim 1 wherein, in valve cartridge (B), said bore in said nozzle (b) runs lengthwise through said nozzle (b).

4. The non-refillable valve as claimed in claim 1 wherein, in valve cartridge (B), said nozzle (b) is positioned in said side port in said housing (a).

5. The non-refillable valve as claimed in claim 1 wherein, in valve cartridge (B), said valve stem means (c) is mounted in said upper portion of said central bore in a screwable manner.

6. The non-refillable valve as claimed in claim 1 wherein, in valve cartridge (B), said valve stem means (c) has an externally-located knob for turning said valve stem means (c).

7. The non-refillable valve as claimed in claim 1 wherein, in valve cartridge (B), an O-ring is mounted in a groove in the valve stem means (c) positioned in said upper portion of said central bore and sealingly engages the surface of said upper portion of said central bore.

8. The non-refillable valve as claimed in claim 1 wherein, in valve cartridge (B), said valve sealing member is made of a resilient plastic.

9. The non-refillable valve as claimed in claim 1 wherein, in valve cartridge (B), the bottom rim of the body portion is bevelled.

10. The non-refillable valve as claimed in claim 1 wherein, in valve cartridge (B), said bore in said nozzle (b) runs lengthwise through said nozzle (b), said nozzle (b) is positioned in said side port in said housing (a), said pressure container is a pressurized gas container, an O-ring is mounted in a groove in the valve stem means (c) positioned in said upper portion of said central bore and sealingly engages the surface of said upper portion of the central bore, said valve sealing member (e) is made of a resilient plastic, and the bottom rim of the body portion is bevelled.

11. The non-refillable valve as claimed in claim 1 wherein, in valve cartridge (B), said pressure container is a pressurized gas container.

12. The non-refillable valve as claimed in claim 11 wherein, in valve cartridge (B), said pressurized gas container is a pressurized gas cylinder.

13. The non-refillable valve as claimed in claim 1 wherein biased valve means (C) is positioned in the central bore of housing (A) below the bottom of valve cartridge (B) located in central bore of housing (A), biased valve means (c) normally being biased in a closed position, and protrusion means is located on the end of housing (a) towards biased valve means (C), when housing (a) is moved towards biased valve means (C), the protrusion means contacts biased valve means (C) and forces biased valve means (C) into an open position.

14. The non-refillable valve as claimed in claim 13 wherein the protrusion means is a shaped rod and biased valve means (C) is biased by means of a spring.

15. The non-refillable valve as claimed in claim 14 wherein the central bore of housing (A) contains a rim, located below valve cartridge (B), which serves as a valve seat for spring-biased valve means (C).

16. The non-refillable valve as claimed in claim 13 wherein the slot in the housing wall of housing (A) has, at its lower end, a downwardly slanted slot portion, nozzle (b) being located in and slidable in the slanted slot portion, when nozzle (b) is moved to the lower end of the slanted slot portion, the protrusion means contacts and forces biased valve means (C) into the open position, and, when nozzle (b) is moved to the upper end of the slanted slot, the protrusion means moves upwards far enough to allow biased valve means (C) to return to the closed position.

* * * * *